US009184585B2

(12) United States Patent
Huselstein et al.

(10) Patent No.: US 9,184,585 B2
(45) Date of Patent: Nov. 10, 2015

(54) REDUNDANCY STRUCTURES FOR STATIC CONVERTERS

(75) Inventors: Jean-Jacques Huselstein, Montpellier (FR); Emmanuel Sarraute, Auzeville Tolosane (FR); Frédéric Richardeau, Flourens (FR); Thierry Martire, Aubais (FR)

(73) Assignees: Institut National Polytechnique de Toulouse (FR); Universite de Toulouse II Le Mirail (FR); Universite Montpellier 2, Sciences et Techniques (FR); Centre National de la Recherche Scientifique (C.N.R.S.) (FR)

( * ) Notice: Subject to any disclaimer, the term of this patent is extended or adjusted under 35 U.S.C. 154(b) by 357 days.

(21) Appl. No.: 13/808,579

(22) PCT Filed: Jun. 24, 2011

(86) PCT No.: PCT/FR2011/051460
§ 371 (c)(1),
(2), (4) Date: Apr. 16, 2013

(87) PCT Pub. No.: WO2012/004488
PCT Pub. Date: Jan. 12, 2012

(65) Prior Publication Data
US 2013/0194840 A1 Aug. 1, 2013

(30) Foreign Application Priority Data
Jul. 7, 2010 (FR) .................................... 10 55523

(51) Int. Cl.
*H02H 7/10* (2006.01)
*H02H 7/12* (2006.01)
(Continued)

(52) U.S. Cl.
CPC .............. *H02H 7/1206* (2013.01); *H02M 1/32* (2013.01); *H02M 7/5387* (2013.01);
(Continued)

(58) Field of Classification Search
CPC ........... H02M 1/32; H02M 1/34; H02M 1/38; H02M 1/092; H02M 7/062; H02M 7/5387; H02M 1/40; H02M 7/53806; H02H 7/127; H02H 7/1227; H02J 3/36
USPC .................. 363/50, 51, 52, 53, 54, 55, 56.01, 363/56.02, 56.03, 56.04, 56.05, 56.06, 363/56.07, 56.08, 56.09, 56.1, 56.11, 56.12, 363/57, 58
See application file for complete search history.

(56) References Cited

U.S. PATENT DOCUMENTS 5,517,401 A * 5/1996 Kinoshita et al. ............... 363/98
5,717,584 A * 2/1998 Rajashekara et al. ........... 363/98
(Continued)

OTHER PUBLICATIONS

International Search Report of the International Searching Authority mailed on Nov. 7, 2011, issued in connection with International Patent Appln. No. PCT/FR2011/051460 (5 pages).
(Continued)

*Primary Examiner* — Adolf Berhane
*Assistant Examiner* — Alex Torres-Rivera
(74) *Attorney, Agent, or Firm* — McCarter & English, LLP

(57) ABSTRACT

The invention relates to a static converter connected between an electrical voltage source and an electrical load, said converter including a main static conversion arm comprising an output electronic switching cell and a backup conversion arm having identical structures. The static converter includes a pair of fuses connected on either side of the main arm, and a switching circuit comprising a connection element connecting the backup arm to the connection points between the fuses and the input terminals of the main arm, such that, when a fault occurs on one of the switching cells forming the main arm, a stable conductive link is established between the two fuses, the main arm is isolated by the two fuses, and the backup arm is spontaneously connected to the output of the main arm via the conductive line and replaces the main arm.

15 Claims, 15 Drawing Sheets

(51) Int. Cl.
*H02M 1/32* (2007.01)
*H02M 7/5387* (2007.01)
*H02M 5/27* (2006.01)
*H02M 7/217* (2006.01)
*H02M 7/487* (2007.01)
*H02M 1/00* (2007.01)

(52) U.S. Cl.
CPC .............. *H02M 5/271* (2013.01); *H02M 7/217* (2013.01); *H02M 7/487* (2013.01); *H02M 2001/007* (2013.01); *H02M 2001/325* (2013.01)

(56) References Cited

U.S. PATENT DOCUMENTS

| | | | |
|---|---|---|---|
| 6,272,028 B1* | 8/2001 | Satoh et al. | 363/56.05 |
| 6,337,804 B1* | 1/2002 | Kea et al. | 363/132 |
| 6,392,907 B1* | 5/2002 | Ichikawa | 363/98 |
| 6,795,323 B2* | 9/2004 | Tanaka et al. | 363/41 |
| 8,582,331 B2* | 11/2013 | Frisch et al. | 363/56.02 |
| 2004/0125523 A1 | 7/2004 | Edwards et al. | |
| 2004/0223346 A1* | 11/2004 | Rayner et al. | 363/37 |
| 2005/0083715 A1* | 4/2005 | Guillarme et al. | 363/65 |
| 2005/0281065 A1* | 12/2005 | Nojima | 363/98 |
| 2011/0157931 A1* | 6/2011 | Sato | 363/56.02 |
| 2012/0206841 A1* | 8/2012 | Harbourt et al. | 361/18 |

OTHER PUBLICATIONS

Written Opinion mailed Nov. 7, 2011, issued in connection with International Patent Appln. No. PCT/FR2011/051460 (9 pages).

Lezana, et al., "Survey on Fault Operation on Multilevel Inverters," IEEE Transactions on Industrial Electronics, vol. 57, No. 7, Jul. 2010 (12 pages).

Zhang, et al., "Four-Legged Three-Phase PFC Rectifier with Fault Tolerant Capability," Power Electronics Specialists Conference (2000) (6 pages).

* cited by examiner

REDUNDANCY STRUCTURES FOR STATIC CONVERTERS

RELATED APPLICATIONS

This application is a U.S. National Phase Application under 35 U.S.C 371 of International Application No. PCT/FR2011/051460 filed Jun. 24, 2011, which was published on Jan. 12, 2012 under International Publication Number WO 2012/004488 A1, which claims the benefit of French Patent Application No. 1055523 filed on Jul. 7, 2010. The disclosures of these applications are incorporated herein by reference in their entireties.

The present invention relates to static voltage converters (DC/AC, DC/DC and AC/AC), designed for the conversion of electrical energy from a direct current voltage source (DC), respectively alternating current (AC) to a load supplied with direct current (DC) or alternating current (AC), respectively with alternating current (AC), and wherein a redundancy structure ensures the operational maintenance or continuity of service of the converter in the event a failure on one of its power components.

The invention also relates to corresponding methods of maintaining the operation of static converters equipped with such redundancy structures.

The redundancy concept for switching cells underlying the invention can also be extended to the structures of voltage rectifiers that convert alternating current electrical energy into direct current electrical energy (AC/DC).

In the field of safety of static converters, there exists a safety concept in terms of the operation of the converter, that is to say, respecting the physical integrity of the converter in the technological sense and safety in terms of the application availability, that is to say, continuity of service.

Among the solutions aimed at ensuring the continuity of service, there are solutions using system redundancy, solutions using built in active redundancy, and solutions using non built in active redundancy, and finally solutions using passive redundancy.

System redundancy consists in segmenting the flow of power by means of the partitioning of a current (through a number Np of converters or cells connected in parallel) and/or the partitioning of voltage (through a number Np of converters or cells connected in series or cascade) and isolating an element when it becomes defective: in open circuit for the parallel configuration and in closed circuit for the series configuration. This approach is mainly used for high power applications where the load is naturally partitioned or distributed and when the converters are designed in the form of a large number of independent modules. It nevertheless has the drawback of increasing the complexity and cost of the converter in terms of the number of power semiconductor elements required and auxiliary circuits.

Built in active redundancy consists of using a series arrangement of a relatively large number N of power semiconductor elements, using the property of spontaneous passage to a stable low impedance state of a semiconductor element when it becomes defective, and to take advantage of the low voltage transfer on to the other N−1 semiconductors in order to ensure maintenance of the function at the cost of the lowering of current and power flow. There is thus in this case a deterioration of the conditions of use of the static converter and if continuity of service is ensured the service is nonetheless degraded.

Non built in active redundancy requires the use of auxiliary active control means that allow the connection of the power semiconductors on the lines through which the power runs. These are for example, relays, thyristors or transistors supporting strong electric currents. The disadvantage of such redundancy is the degradation of the reliability of the implementation of redundancy in case of emergency mainly on account of the use of control circuits.

Passive redundancy consists in duplicating a cell or a converter, generally in parallel configuration, placing the cell or converter in an inactive state in terms of its control (which does not mean that redundancy is turned off). As simple as it is, this form of redundancy presents the problem of disconnection of the load of the defective cell then its connection to the standby cell, especially without a multiphase configuration where the extra costs and complexity of the auxiliary components become prohibitive.

The document entitled "Fault-tolerant Multilevel Converter Topology" by S. Ceballos et al., published in IEEE ISIE 2006, Jul. 9-12, Quebec, Canada, provides an improvement in the reliability of a multilevel inverter with non built in active redundancy using instead of controlled active means of connection, diodes as uncontrolled passive means of connection. The document describes an architecture with variants of a fault tolerant multi-level inverter.

The document describes in particular a multi-level three phase output inverter including for each of the phases a main switching arm. Each main switching arm includes four transistors in series in the same direction. The centre tap of this combination forms an outlet for delivery of the current to one phase of the electric load and each electronic switch comprises a combination of a power transistor and a diode connected in antiparallel. The switches of the switching cells of the main switching arm are provided with control means configured so that the inverter outputs in normal operation on each phase an alternating current at the same frequency and at three voltage levels. Each main switching arm is connected to a same first terminal with positive polarity and to a second terminal with negative polarity of the direct current voltage source by means of a first fuse and a second associated fuse. The inverter also includes an auxiliary switching arm with a different structure and with floating capacitance meant for supplying in an original manner a neutral point of stable voltage corresponding to half of the total voltage for the three main switching arms. The auxiliary switching arm comprises a structure of switches formed by very different transistors, in the form of two nested cells, one external and the other internal to the arm. The centre tap (mid point) of the internal nested switching cell of the auxiliary arm is connected to the internal symmetrical terminals that are joined to a different main switching arm through a switching circuit of a different associated switching current. Each switching circuit comprises a first diode connected directly from the mid-point output of the internal switching cell of the auxiliary arm to a first terminal, common point of the two first transistors of the main arm. This first diode is connected indirectly to the first terminal with positive polarity of the source by means of a first switch and a fuse. Each switching circuit comprises a second diode connected directly from the output centre tap of the internal switching cell of the auxiliary arm to a second terminal, common point of the other transistors connected in series, of the main switching arm. This second diode is connected indirectly to the second negative polarity terminal of the source, by means of the fourth switch of the arm and the other fuse. In normal operation, the control means associated with the switches of the switching cells of the auxiliary arm are configured in a manner so as to regulate the neutral point of voltage by the supply of a current distributed to the main switching arm. Thus, during normal operation the switches of the auxiliary switching arm are actuated and the current flows through the arm. The auxiliary arm thus does not act according to a hot passive redundancy but rather according to a non built in active redundancy.

In emergency back up mode, when on a main switching arm in the normal active mode a switch becomes faulty, the first and second fuses of the main switching arm isolate the arm of the power source due to the fact that their $I^2t$ characteristic is lower than that of chip to package interconnections of the power transistors. The means for controlling the switches of the auxiliary arm and the faulty main arm are then reconfigured in a manner such that the auxiliary arm is substituted for the defective main switching arm. In this case, the phase corresponding to the initial fault remains in three level modulation but the provision of a neutral point to the other two main switching arms is no longer ensured. The latter must then be subjected to a degraded mode passing from a modulation of three levels to two levels. In addition in a detrimental fashion the passage into two levels requires either a disconnection of the auxiliary arm which is complex to carry out, or the permanent blocking of the diodes by the permanent conduction of the transistors connected to the fuses. In the case of the permanent blocking of the diodes, only internal transistors switch and keep the voltage to be thus over-dimensioned by 100% voltage and a lowering of current is to be expected in emergency back up mode.

The aim of the invention is to improve, in a simple manner, the reliability and continuity of service of a static converter, an active component of which in normal operation happens to break down. This may be accomplished through the improvement of the reliability of the means for implementation of the operational safety of the static converter by means of an automatic emergency back up mode.

The present invention provides a solution where the emergency back up arm is a passive redundancy system that can be connected very simply and indifferently to any faulty arm connected in parallel, without degraded mode or decommissioning, and without the other non defective arms themselves needing to be reconfigured and being compromised or subjected to degraded mode.

To this end, the object of the invention relates to a static converter designed for the conversion of electrical energy between a direct current or alternating current power source and an electrical load. The converter comprises:

a main static conversion arm comprising of at least one electronic switching cell with semiconductors equipped with associated control means, a first input terminal and a second power supply input terminal, capable of being connected respectively to a first polarity and a second polarity of the power source, an output terminal connected to an output switching cell and suitable for being connected to the electrical load, each switching cell being configured through its associated control means to be active in a predetermined nominal mode of the converter, a pair of isolation components associated with the main switching arm, formed of a first isolation component and a second isolation component each forming a dipole, the first isolation component and the second isolation component being connected directly and respectively to the first terminal and to the second power supply input terminal of the main arm.

The static converter is characterised in that it comprises of:
An emergency back up conversion arm consisting of at least one electronic switching cell with semiconductors equipped with associated control means, a first input terminal and a second power supply input terminal, suitable for being connected respectively to a first polarity and a second polarity of the power source, an output terminal connected to an output switching cell, and an electronic semiconductor switching circuit having a connection element connected between the output terminal of the emergency back up arm and an input terminal of the main arm from among the first input terminal and the second input terminal of the main arm.

The converter is further characterised in that:

the switching cell or cells of the main arm connected in series between the first input terminal and the second input terminal are each capable of providing a stable permanent impedance less than a few tens of milli-ohms when the main arm has experienced a failure resulting from a thermal runaway or a short circuit in one of its semi-conductor components, and the isolation components of the main arm are dimensioned in a manner so as to isolate the main arm after the lapse of a first time period t1 for the establishment of a stable low impedance failure mode on the switching cell or cells of the main conversion arm connected in series and before the lapse of a second time period t2 to avoid the creation of a circuit opening on the main conversion arm, and the control means of the emergency back up cell or cells forming the emergency back up arms are capable of being deployed after the isolation of the main conversion arm that has become faulty so as to replace the main arm partially or in its entirety, the connection element is configured to be in a locked (Off) state when the main arm is active in the nominal mode and to be in a conductive (On) state when the main arm has become faulty and the emergency back up arm has become active In accordance with particular embodiments, the static converter comprises one or more of the following characteristics:

the connection element is an element that is included in the assembly consisting of a diode, a thyristor, a combination of two thyristors connected in inverse parallel (head to toe) and a transistor;

the semiconductor elements of the switching cells of the emergency back up conversion arm are configured so as to be in a locked state when the main arm is active in the nominal mode and to replace the main arm partially or in its entirety after isolation of the arm that has become faulty;

the converter comprises means for aiding in the isolation of the main arm, the isolation aiding means comprising of an auxiliary thyristor or a combination of two auxiliary thyristors assembled in inverse parallel (head to tail), connected in parallel to the first input terminal and to the second input terminal of the main arm, an auxiliary thyristor being connected when the voltage source is a direct current source and a combination of two auxiliary thyristors connected in inverse parallel being used when the voltage source is an alternating current source, and the control means of the auxiliary thyristor or of the two auxiliary thyristors configured in a manner such that if the faulty main conversion arm is not symmetrically isolated by the pair of isolation components that are associated with it, it creates a short circuit at the terminals of the electrical load in order to induce a symmetrical isolation by each isolation component of the pair;

the converter comprises, for each switching cell of the main conversion arm, associated rapid protection means capable of detecting an intolerable short circuit current flowing through the cell in comparison to a predetermined threshold value of a current and of triggering the opening of the switching cell after the detection of the threshold current being exceeded;

the converter in addition comprises the means for detecting the faulty main arm that are capable of commanding the means of control of the switching cells of the emergency back up arm to adopt the same control configuration as that of the arm detected as being faulty;

the static converter comprises at least two main arms, each main arm being identical in structure and including at least one electronic switching cell equipped with associated control means, a first input terminal and a second power supply input terminal capable of being respectively connected to a first polarity and a second polarity of the power source, a phase output terminal connected to an output switching cell capable of being connected to a separate and distinct phase of the electrical load, each switching cell being configured through its control means so as to be active in a predetermined nominal mode of the converter; and the converter comprises, for each main conversion arm, of a pair of associated isolation components that are formed of a first isolation component and of a second isolation component, each forming a dipole, the first isolation component and the second isolation component being directly and respectively connected to the first input terminal and the second power supply input terminal, of the associated main arm, and the converter comprises a single emergency back up conversion arm having at least one output switching cell and an output terminal connected to the output switching cell, and the converter comprises, for each main conversion arm an associated switching circuit having a connection element connected between the output terminal of the emergency back up arm and the first input terminal of the associated main conversion arm, and the converter comprises for each main conversion arm, the means for detection and location of the faulty main arm that are capable of commanding the control means of the switching cells of the emergency back up arm to adopt the same control configuration as that of the faulty arm that has been detected and located, and the switching cell or cells of any main arm connected in series between the first input terminal and the second input terminal are each capable of providing a stable permanent impedance less than a few tens of milli-ohms when the main arm has experienced a failure resulting from a thermal runaway or a short circuit of one of its semi-conductor components, and the isolation components of each main arm are dimensioned in a manner so as to isolate the main arm after the lapse of a first time period t1 for the establishment of a stable low impedance failure mode on the switching cell or cells of the main conversion arm connected in series and before the lapse of a second time period t2 to avoid the creation of a circuit opening on the main conversion arm, and the control means of the emergency back up cell or cells forming the emergency back up arms are capable of being deployed after the isolation of any of the main arms that has become faulty so as to replace the main arm that has become faulty partially or in its entirety, and the connection element or the two connection elements of each switching circuit associated with a main arm are configured to be in a locked (Off) state when the main arm is active in the nominal mode and in a conductive (On) state when the main arm has become faulty and the emergency back up arm has become active;

the static converter comprises a first number N greater than or equal to two, of the main switching arms, a second number K greater than or equal to two, of the emergency back up switching arm, the same second number K of the switching circuit, each switching circuit being associated with a distinctly separate main switching arm, the first number N being greater than or equal to the first number K, and each main arm is identical in structure and comprises at least one electronic switching cell equipped with associated control means, a first input terminal and a second power supply input terminal capable of being respectively connected to a first polarity and a second polarity of the power source, a phase output terminal connected to an output switching cell capable of being connected to a separate and distinct phase of the electrical load, each switching cell being configured through its control means so as to be active in a predetermined nominal mode of the converter, and the converter comprises, for each main conversion arm, a pair of associated isolation components that are formed of a first isolation component and of a second isolation component, each forming a dipole, the first isolation component and the second isolation component being directly and respectively connected to the first input terminal and the second power supply input terminal, of the associated main arm, and each emergency back up arm consisting of at least one electronic switching cell with semiconductors equipped with associated control means, a first input terminal and a second power supply input terminal, suitable for being connected respectively to a first polarity and a second polarity of the power source, an output terminal connected to an output switching cell; and each switching circuit associated with a main arm is an electronic semiconductor multi-pole comprising K connection elements, each connection element is a thyristor when the voltage source is a direct current source and a combination of two auxiliary thyristors connected in inverse parallel when the voltage source is an alternating current source, each switching circuit comprises of control means associated with thyristors, each connection element of the same switching circuit includes an input connected to the output of a different emergency back up arm and an output connected to the first input of the main switching arm with which the switching circuit is associated.

the control means of the thyristors of the switching circuits are configured so as to be in a locked state when the main arms with which they are associated are active;

the control means of the thyristors of the switching circuits are configured in a manner such that when any which main switching arm connected to a switcher is faulty, it is able to be backed up by any one of the emergency back up arms that have not yet become active;

the converter is an inverter capable of being connected to a direct current voltage source and of outputting to an electrical load an alternating current over at least one phase, the first input terminal and the second power supply input terminal of a main arm are capable of being respectively connected to a first positive polarity and a second negative polarity of the power source;

each switching cell of a main arm or of an emergency back up arm includes a pair of bidirectional power switches connected in series, each bidirectional power switch being formed by a controlled switch and an associated diode connected in antiparallel, each controlled switch being an element included in the assembly formed by thyristors, IGBT transistors, and MOS transistors;

the control means of the switching cells of the main arm or arms are configured in a manner such that the converter operates as an inverter on one or more phases and;

the switching circuit comprises of a first uncontrolled unidirectional power semiconductor connection element and a second uncontrolled unidirectional power semiconductor connection element, the first connection element being connected in direct from the output of the emergency back up arm to the first input terminal of the main arm, the second connection element being connected in reverse from the output of the emergency back up arm to the second negative input terminal of the main arm;

the converter is a chopper capable of being connected to a direct current voltage source and of outputting to an electrical load a direct current over at least one output phase, the first input terminal and the second power supply input terminal of a main arm are capable of being respectively connected to a first positive polarity and a second negative polarity of the power source, each switching cell of a main arm or of an emergency back up arm includes a pair of bidirectional power switches connected in series with a diode or a second switch, each bidirectional power switch being formed by a controlled switch and an associated diode connected in antiparallel, each controlled switch being an element included in the assembly formed by thyristors, IGBT transistors, and MOS transistors;

the control means of the switching cells of the main arm or arms are configured in a manner such that the converter operates as a chopper, the switching circuit associated with a main arm comprises of a single semiconductor connection element configured to have unidirectional power flow, the unidirectional connection element being connected in direct from the output of the emergency back up arm to the first input terminal of the associated main conversion arm;

the converter is a converter of the AC/AC family capable of converting electrical energy between an alternating current voltage source and of outputting to an electrical load an alternating current over at least one output phase, the first input terminal and the second power supply input terminal of any main arm are capable of being respectively connected to a first positive polarity and a second negative polarity of the power source;

each switching cell of a main arm or of an emergency back up arm includes a pair of bidirectional power switches connected in series, each bidirectional power switch being formed by a controlled switch and an associated diode connected in antiparallel, each controlled switch being an element included in the assembly formed by thyristors, IGBT transistors, and MOS transistors;

the control means of the switching cells of the main arm or arms are configured in a manner such that the converter operates as an AC/AC type voltage converter on one or more output phases, the switching circuit comprises of a first bidirectional power semiconductor connection element and a second bidirectional power and voltage semiconductor connection element, the first connection element being connected from the output of the emergency back up arm to the first input terminal of the main arm, the second connection element being connected in reverse from the output of the emergency back up arm to the second negative input terminal of the main arm.

The invention also relates to an implementation process for ensuring the continued operation of a static converter as defined above, characterised in that it comprises of the steps consisting of the following:

the control means of the controlled switches of the switching cells of the main arms are configured in a manner such that the static converter operates in a nominal fashion on the main arms when none of the power components forming the main arm is faulty, when a fault occurs on a switch of a main cell, all the switches of the main arm to which the defective switch belongs and which are connected in series, are short circuited for a time period t for obtaining the isolation of the main arm that became faulty, which is greater than a first time period t1 for the main arm to reach a stable and permanent conductive state at very low impedance less than a few tens of milli-ohms, and less than a second time period t2 below which the integrity of the components of the defective main arm is preserved as well as the conductive state attained by the defective main arm, the emergency back up switches configured in the same configuration as that of the switches of the faulty main arm are connected automatically by the switching circuit of the defective main arm that became a stable conductor.

The originality of the concept of the invention is based on a single redundant circuit structure in passive mode (dormant circuit passive redundancy) whose connection occurs spontaneously and very simply in order to supplement upon the failure of any number of active switching cells connected to the sole redundant circuit. This emergency backup connection uses the property of the first short circuit failure of the power chips with which are associated the diodes or switching thyristors that allow for spontaneously switching from normal to emergency standby mode. This innovation aims to simplify the usual redundancy solutions by means of a reduced complexity and low additional costs. The concept is likely to find a wide range of applications for the applications known as "sensitive" where operational safety and continuity of service must be reconciled, without excessive additional costs and with controlled overall reliability.

Invention will be better understood upon the reading of the following description, given solely by way of example and with reference being made to the drawings in which.

Figure 1:
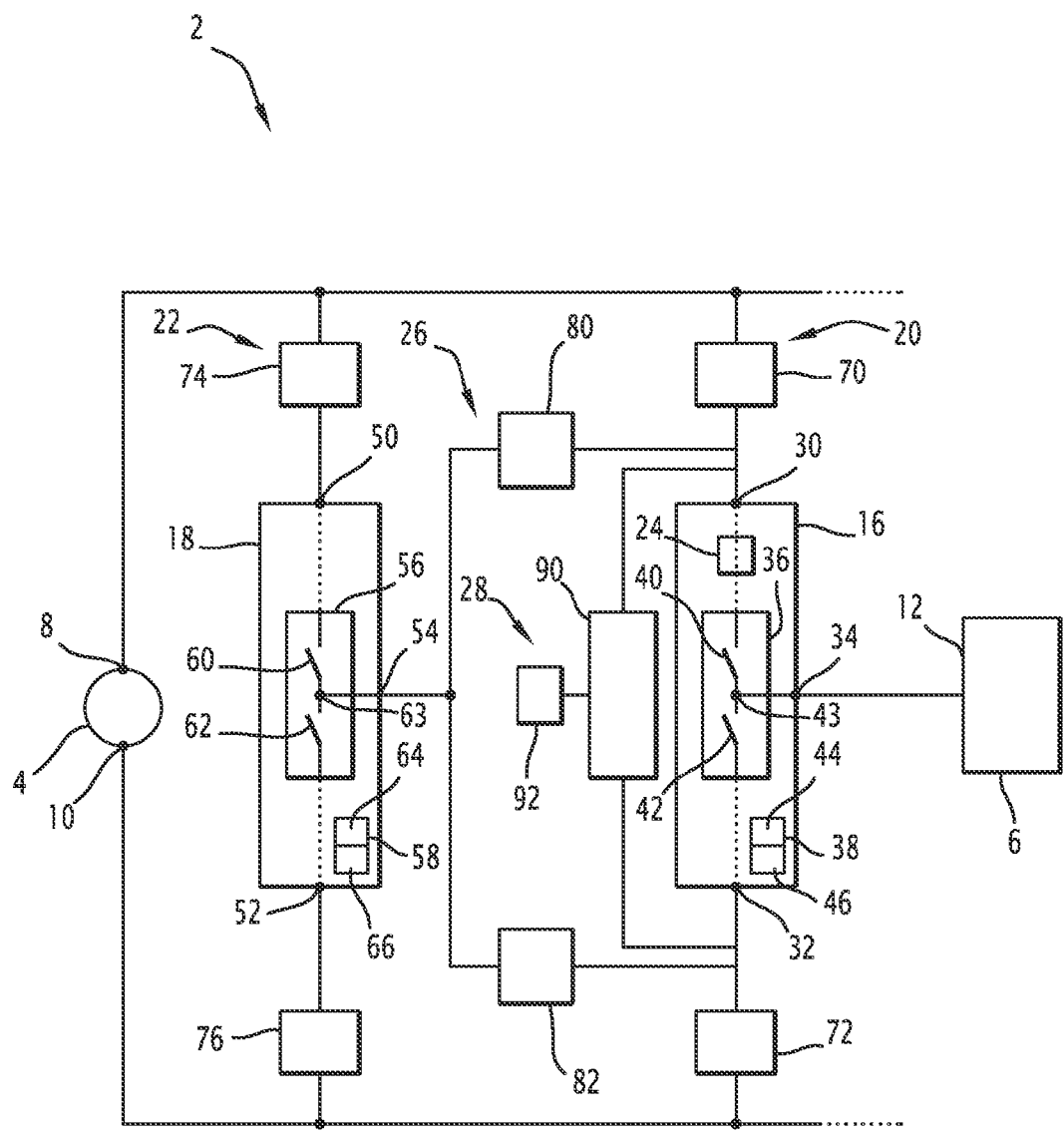
FIG. 1 is a partial circuit diagram of a static converter included among the alternating-alternating current voltage converters (AC/AC), inverters (DC/AC/) and choppers (DC/DC/) according to the invention.

According to FIG. 1, a static converter 2 is connected between an electric voltage source 4 and an electrical load 6.

The voltage source 4 is either a direct current DC voltage source or an alternating current AC voltage source.

When the voltage source 4 is a direct current DC voltage source, the electrical load 6 is supplied here by an alternating current voltage and in this case the DC/AC type static converter is called inverter.

When the voltage source 4 is an alternating current AC voltage source, the electrical load 6 is supplied by an alternating current voltage, and in this case the static converter is of AC/AC type.

As a variant, when the voltage source 4 is direct and the electrical load 6 is supplied by a direct current voltage whose level is adjustable, the static converter is of DC/DC type and is called chopper.

The static converter 2 is connected at the input to a first polarity 8 and a second polarity 10 of the power source 4 and at the output it is connected to at least one input electrical terminal 12 of the electrical load 6.

The static converter 2 comprises of a main static conversion arm 16, an emergency back up static conversion arm 18, a pair of isolation components 20 joined to the main arm 16, a pair of isolation components 22 joined to the emergency back up arm 18, the means for detection and location 24 of a main arm 16 that is faulty, a switching circuit 26 with semiconductors and means for supporting the isolation 28 of the main arm 16.

The main static conversion arm 16 includes a first power supply input terminal 30 and a second power supply input terminal 32 connected indirectly and respectively to the first polarity 8 and to the second polarity 10 of the power source 4 and an output terminal 34 connected to the input terminal 12 of the electrical load 6 and capable of delivering an output current.

The main arm 16 includes an output electronic semiconductor switching cell 36 equipped with a joined control means 38 and connected to the output terminal 34 of the main arm, and as may be appropriate, with other switching cells shown by broken lines in FIG. 1 and provided with joined control means not shown. Each switching cell, including the output switching cell 36 is configured through its joined control means to be active in a predetermined nominal mode of the static converter 2.

In a conventional manner, an electronic switching cell comprises of two electronic switches, connected between a voltage source, here the voltage source 4, and a power source, here the electrical load 6, of which only one single one is controlled. These switches are a priori arbitrary and in terms of the control, the switches of the same switching cell cannot be simultaneously opened or closed.

Here, the output switching cell 36 includes a first electronic switch 40 and a second electronic switch 42, connected in series by a centre tap (mid point) 43 connected to the output terminal 34.

The first switch 40 is connected directly or indirectly to the first input power supply terminal 30 opposite to the centre tap 43 and the outlet terminal 34.

The second switch 42 is connected directly or indirectly to the second input power supply terminal 32 opposite to the centre tap 43 and the output terminal 34.

The first electronic switch 40 is a controlled switch whereas the second switch is either controlled or uncontrolled.

A controlled switch is an electronic element with semiconductors, included in the assembly formed by the thyristors, the IGBT (Insulated Gate Bipolar Transistor) type transistors, the MOS (Metal Oxide Silicon Transistor) type transistors and the GTOs (Gate Turn Off transistor).

When the second switch 42 is controlled, the converter is an inverter.

When the second switch 42 is not controlled, it is a diode, and the converter is a chopper.

The control means 38 of the output switching cell 36 of the main arm are divided into the first control means 44 joined to the first switch 40 and, as may be appropriate, the second control means 46 joined to the second switch 42.

Each switching cell of the main arm 16 is capable of providing a stable and permanent state having a stable permanent impedance less than a few tens of milli-ohms when the conversion arm has experienced a failure resulting from a thermal runaway or a short circuit in one of its semiconductor components, and where it has been provisionally short circuited between the terminals of the voltage source. Thus, after a first undesired failure of a first power component of the main arm and a cascade of subsequent desired failures of power components of the arm connected in series between the first input terminal and the second input terminal, the failed main arm is capable of becoming a conductive power line.

The emergency back up static conversion arm 18 may have a structure identical to that of the main arm 16 or a structure reduced to the bare minimum with a minimum of components necessary to ensure the required conversion, in order to not degrade the reliability and lead to an additional cost. Indeed, the redundancy being passive, it is necessary to simplify its structure to the maximum because it is inactive during normal operation of the converter.

The emergency back up static conversion arm 18 includes a first power supply input terminal 50, a second power supply input terminal 52, an output terminal 54, an output electronic semiconductor switching cell 56 equipped with joined control means 58, and as may be appropriate, other switching cells represented by dashed lines in FIG. 1 and equipped with joined control means not shown.

The output switching cell 56 of the emergency back up arm 18 back comprises of a first electronic switch 60 and a second electronic switch 62 connected in series by a centre tap 63.

The first switch 60 is directly or indirectly connected to the first input power supply terminal 50 opposite to the centre tap 63 and the output terminal 54.

The second switch 62 is connected directly or indirectly to the second input power supply terminal 52 opposite to the centre tap 63 and the output terminal 54.

The control means 58 of the output switching cell 56 are divided into the first control means 64 joined to the first switch 60 and the second control means 66 joined to the second switch 62.

The control means of the emergency back up cell or cells forming the emergency back up arm 18 are capable of being deployed after the isolation of the main conversion arm 16 that has become faulty so as to replace the main arm partially or in its entirety 16.

The component elements of the emergency back up arm 18 described here above are interconnected amongst themselves and connected to the source 4 and to the electrical load 6 in an analogous manner to the component elements comprising the main conversion arm 16.

The pair of isolation components 20, joined to the main conversion arm 16 is formed of a first isolation component 70 and of a second isolation component 72 each forming a passive dipole. The first isolation component 70, the second isolation component 72 respectively, is directly connected between the first polarity 8 of the source 4 and the first input terminal 30 of the main arm 16, respectively the second polarity 10 of the source 4 and the second input terminal 32 of the main arm 16.

The isolation components 70, 72 of the main arm are dimensioned in a manner so as to isolate the main arm after the lapse of a first time period t1 for the establishment of a stable low impedance failure mode on the switching cell or cells forming the main switching arm 16 and the before the lapse of a second time period t2 to prevent the creation of a circuit opening on the main switching arm 16.

The pair of isolation components 22, joined to the emergency back up arm 18, is formed of a first isolation component 74 and of a second isolation component 76 each forming a passive dipole. The first isolation component 74, and the second isolation component 76, are directly connected respectively, between the first polarity 8 of the source 4 and the first input terminal 50 of the emergency back up arm 18, and respectively between the second polarity 10 of the source 4 and the second input terminal 52 of the emergency back up arm 18.

An isolation component is a component included in the family of components consisting of fuses, electronic circuit breakers, disconnectors-switches, and any combination of the latter.

The means for detection and location 24 of a defective main arm 16 are able to ensure the detection of a defective arm and the location of the defective arm.

Various embodiments of the means for detection and location 24 exist.

For example, the means for detection and location 24 of a faulty main arm comprise fuse strikers 70, 72 and an electronic interface to the control means 58 of the emergency back up arm 18. A striker makes it possible to mechanically actuate an auxiliary electrical contact in a simple and economical manner.

Another way to develop the means of detection is the use of the signals "Flag default" (French: "drapeau de défaut") provided by the short circuit protection mechanisms installed on the switch card drivers available on the market. A low level "Flag" type signal (French: "Drapeau") electrically isolated, changes in level in a permanent fashion when a fault is detected through a variation characteristic of a current from a control device (called "driver"), and enables a simple and economic interface with the control means for the switches of the emergency back up arm. It should be noted that the current trend is inclined towards fully programmable protection mechanisms by way of templates in terms of time thresholding—VCEsat amplitude, with greater noise immunity in the phases of switching, VCEsat (Collector Emitter Saturation Voltage) designating the collector-emitter voltage of the control device in saturation.

In another embodiment, the means for detection and location 24 of a faulty main arm consist of a circuit comprising of a voltage divider, a diode detector, a transistor or comparator, and an opto-coupler acting as input interface with the control means of the switches of the emergency back up arm. Such a circuit is able to detect just one abnormal wave form at the level of the switching cell through comparison and an amplitude-time threshold between the control signal of the switching cell monitored of the main arm and the instantaneous output voltage of the switching cell.

By way of a variant, in the case of a static converter, where the main arm to be backed up is fixed, for example in the case where the converter comprises of a single main conversion arm, the means of detection and location 24 of the faulty arm are omitted and the control means of the switches of the emergency back up arm 18 are active during normal active operation of the main arm, while being configured in an identical manner.

The switching circuit 26 comprises of at least one connection element connected between the output 54 of the emergency back up arm and an input terminal of the main arm 16 from amongst the first input terminal 30 and the second input terminal 32 of the main arm 16. The connection element is included in the assembly of elements with semiconductors that is constituted of the diodes, thyristors, the combination of two thyristors connected in inverse parallel (head to tail) and the thyristors.

Each connection element is configured to be in a locked (Off) state when the main arm is active in a normal mode of operation, that is to say, without any failure on the main arm.

Each connection element is configured to be in a conductive state (On) when the main arm is faulty and the emergency back up arm has become active.

In FIG. 1, the switching circuit 26 includes a first connection element 80 and a second connection element 82.

The first connection element 80 is directly connected between the output terminal 54 of the emergency back up arm 18 and the first input terminal 30 of the main arm 16.

The second connection element 82 is directly connected between the output terminal 54 of the emergency back up arm 18 and the second input terminal 32 of the main arm 16.

The configuration shown in FIG. 1 with two connection elements is that of a switching circuit suitable for a DC/AC inverter or an AC/AC type converter.

In case of an inverter, the switching circuit 26 is for example formed of two diodes.

In the case of an AC/AC type circuit, the switching circuit 26 is for example a pair of two combinations of thyristors connected in inverse parallel.

By way of a variant, the second switches of the main arm and the emergency back up arm are diodes and the second unidirectional element is omitted. This configuration corresponds to that of one or more choppers connected in parallel.

By way of a variant, the pair of isolation components joined to the emergency back up arm is omitted.

The means for supporting isolation 28 of the main arm 16 includes an auxiliary thyristor 90 to aid in the isolation of the main conversion arm 16, connected in parallel to the first input terminal 30 and to the second input terminal 32 of the main arm 16, and the control means 92 of the auxiliary thyristor 90 for aiding in the isolation.

The control means 92 of the auxiliary thyristor are configured in a manner such that if the main switching arm 16 when it becomes faulty, is not symmetrically isolated by the pair of isolation components which are joined to it, it creates a short circuit across the terminals of the electrical load 8 in order to induce the symmetrical isolation by the two isolation components, in particular when the isolation components are fuses.

With regard to the safety of operation of the static converter, the critical situation or critical failure corresponds to the short circuit of the direct current voltage source 4 (DCV). This situation can occur in two ways: the first, in an external fashion by way of a faulty command from one or several of the control means of the main arm 16 leading to activating of conduction of two switches in a given switching cell, for example the two switches 40 and 42 of the cell 36 and for a period of time long enough to cause the thermal runaway and failure in cascade of the two electronic switches in the form of chips; the second, in an internal fashion by way of the initial failure of one of the power switches (transistor or diode in avalanche mode or thermal runaway condition, short circuit of the load 6 or "dead short" ground isolation fault [French: "défaut franc"]) in turn causing the short circuiting of the homologous switch, its failure, then the short circuiting of the direct current voltage source 4 DCV.

In FIG. 1 the second switch 42 is homologous to the first switch 40 of the output cell 36.

The putting into safety mode of a faulty cell according to the invention is achieved by avoiding the "durable" short circuit of the source 4 DCV as well as the transitional regime applied to the load 6 connected to the source 4 DCV by means of the faulty main arm 16.

The putting into safety mode includes a step consisting of limiting the short circuit current and spontaneously isolating the main arm 16 through the two isolation components connected to the two polarities of the voltage source. In a general manner, the isolation function is carried out over two tracks in order to symmetrically isolate the main arm, simultaneously and spontaneously by fuse, or by a command in contact breaker mode.

In fuse mode, it should indeed be noted in this pathway that the failure occurs in cascade of power chips, whatever be its origin, and causes a "lever" effect aided by the cut off (known as "crow-bar"), ie a complete and symmetric failure of the cell, used here to spontaneously trigger the two fuses on both poles. The technology of these fuses is not detailed here. These fuses can be either external to the components forming the switches (Protistor™ type fuse, busbar fuse and at the main arm 16 (optional and non-invasive solution), or built in and integrated within the components (connection that is itself a fuse, little chip fuse, fuse mounted on DBC ("Direct Bonding Copper") and other substrate, . . . ) or fabricated directly on the DBC through machining, by laser ablation or by photolithography.

In order to fulfill its role, this isolation step must be rapid enough, that is to say, it should have a time of deployment of the effective isolation of the main arm that is less than the second time period t2 in order to avoid any breaking of the wired connection internal to the components and the risk of explosion of the encapsulation (risk of excessive overvoltage and of discharging of metal, resin at high temperature) causing an unwanted open circuit. Nevertheless, the presence of means for supporting the isolation 28 of the main arm 16, for example provided in the form of the auxiliary thyristor 90 and diodes of the main arm 16 not shown in FIG. 1 making it possible in this case to provide a conduction path in emergency back up mode even if the switches of the main arm are in open circuit as a result of an "open circuit" type fault or of improperly sized fuses.

Another isolation mode exists for avoiding the risk of failure of isolation between times t1 and t2. It consists of opening the arm just after t1 by the corresponding switch homologous to the fault and by its short circuit protection on its driving mechanism (known as 'driver'). The main arm 16 is thus found in a state of asymmetrical fault and in order to achieve the state of symmetrical isolation it is thus necessary to turn on the thyristor 90 which enables back up conduction by itself and the diodes of the main arm 16.

The $I^2T$ characteristics and breaking capacity of fuses are determined in a manner so as to ensure that the time period for the establishment of the isolation of the arm t is less than the second time period.

If this selectivity condition defined by the adherence to the time period of isolation being less than the second period t2 is fulfilled, the faulty chips of the main arm can be present in a resistive state of very low value (by experience from a few $m\Omega$ to a few tens of $m\Omega$) depending on the density of energy dissipated in the fault zone of the chips and the technological characteristics which surround the chips and the time period t of isolation of the main arm.

The type of metallisation, for example a layer of aluminum or alloys in "thick planar copper layer" connection such as aluminum—silicon alloys, aluminum copper, aluminum—titanium—copper the thickness of metallisation, the type of interconnection (for example connection by welded wires (known as "wire bonding"), tape connection, connection by buffering (known as "bump"), connection by micro-column, connection by frame (known as "lead frame") connection by balls of a network of balls (known as Flip Chip Ball Grid Array "flip-chip BGA"), by brass layer (contact by electroplating or the GE-Overlay technique (give the meaning of the acronym GE), the dimensions of the interconnection, the type of flip chip embedding (pressed or soldered chip) and type of encapsulation (in resin mass or a silicone gel) will also influence the stability in the time of the fault resistance of the power line of the main conductive arm thus formed if the conductive line of the main arm 16 is required to provide for a function of back up conduction.

A minimum short circuit duration for the main arm, that is to say, the first time period t1 must also be guaranteed in a manner such that there is sufficient time in order for the generation of the stable and permanent low impedance failure mode of the faulty chips to be established.

In other words, in the fuse mode in particular, the time period for establishment of the isolation t by the fuses 70, 72 must be greater than the first time period t1 corresponding to the minimum time required for the achievement of a low impedance state of the all chips in series of the main arm and less than the second time period t2.

Thus, the use of this "very low impedance" failure mode of the faulty chips of the main arm 16 allows for ensuring the continuation and achievement of the converter's purpose by an original connection "in series" of the emergency back up arm 18 in passive redundancy, that is to say, not actuated during the normal active operation of the main arm but having to withstand the voltage in the locked state.

The arrangement of the two isolation components joined to the main arm on the two polarities of the source 4 and the arrangement of the connection elements of the switching circuit in direct connection with the terminals of the fuses opposite in polarity to the source, offer the advantage of being able to spontaneously connect the emergency back up arm to the output terminal of the main arm, simply by means of two connection elements simple in their structure and in their auxiliary control means, and the faulty chips of the main arm that are themselves backed up.

Preferably, in normal operation of the converter, that is to say when there is no failure, the control means 58 of the switches of the emergency back up arm 18 are configured in a manner such that the emergency back up arm is placed in a stand by state with minimum stress and constraints on the power components.

For example, the control means 58 of the switches of the emergency back up arm 18 are configured in a manner such that its transistors and its diodes are kept in a locked static state.

Thus, in passive mode, all dormant components of the emergency back up arm, including therein the switching circuit, share the common voltage of the source 4 and only withstand a voltage reduced by half DCV/2 filtered by the supply bus of the source and therefore free of voltage variation in relation to time, denoted by dv/dt. The leakage current whose components will be the seat will thus be reduced by avoiding the risk of static thermal runaway if the temperature of the housing were to be raised. Moreover, in standby mode, the connection elements each in their turn conduct the load current without any stress of switching. In the case of operation of the converter in inverter or chopper mode the conventional rectifier diodes are thus quite appropriate for satisfactorily carrying out the function of connection elements of the switching circuit, these connection diodes have a bonus leakage current and a more favorable level of thermal runaway than switching diodes of the same calibre.

To be viable, such an operation must be based on technology choices that make it possible to ensure a low fault resistance at significant power and in a permanent manner over a significant time period.

In the context of applications based on an in built and integrated active redundancy mode, technologies based on thick metallisation, buffering (known as "bumps") or pressed chip have been developed. They are very favourable and also use the low-impedance property of a faulty chip. These technologies are applicable to the invention.

It is to be noted that the welded wire connection technology (known as wire-bonding) in the process of being evaluated for the two types of encapsulating materials which are resin mass and silicone gel has already provided promising results.

In the event of the technological characteristics not being achieved to ensure viable conduction of faulty chips, the addition of auxiliary thyristor 90 enables on the one hand, the partial or complete aiding of isolation of the polarity terminals of the source 4, and on the other hand, a connection in series by diodes of the faulty main arm in redundancy mode and in parallel with the faulty transistors. This strategy assumes that the diodes are not defective or, more specifically, that their failure rate is overall much lower than that of transistors over the duration of operation considered. The addition of this auxiliary thyristor also allows for compensating for the failure of the close chain of control of the transistors (absence of control or deteriorated control or erratic control) which expands the field of interest.

Figure 2:
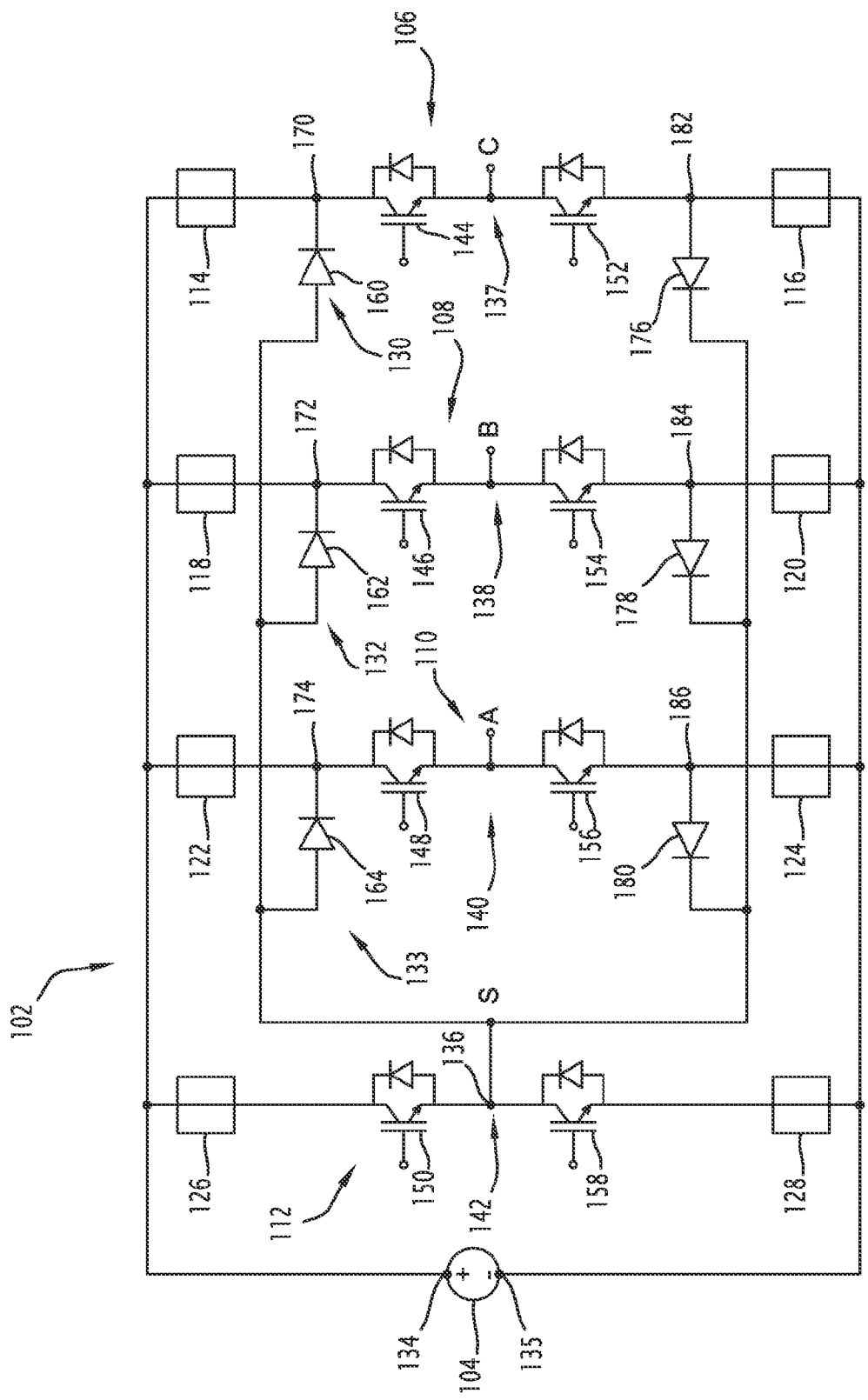
FIG. 2 is a circuit diagram of a first embodiment of the converter in FIG. 1; that of a three phase output inverter with redundancy provided by an emergency back up arm.

According to FIG. 2, the static converter is a three phase inverter 102 connected between a source 104 of direct current voltage and a three phase input load that is not shown.

The inverter 102 includes three main static conversion arms 106, 108, 110 and an emergency back up arm 112 of identical structure.

The inverter also includes isolation components 114, 116, 118, 120, 122, 124, 126, 128 which in this instance are fuses and which are associated in two by two arrangement in four distinct pairs, and three switching circuits 130, 132, 133.

Each main arm 106, 108, 110 is connected between a single positive polarity terminal 134 and a single negative polarity terminal 135 of the source 104 by means of a different respective pair of fuses, the fuses 114, 116 for the arm 106, the fuses 118, 120 for the arm 108 and the fuses 122, 124 for the main arm 110.

The emergency back up arm 112 is connected between the positive polarity terminal 134 and the negative polarity terminal 135 of the source 104 by means of the pair of fuses 126, 128 and includes an output terminal 136.

Each main arm 106, 108, 110 and the emergency back up arm 112 respectively comprise of a single switching cell 137, 138, 140, 142 with two voltage levels of identical structure.

Each switching cell 137, 138, 140, 142 comprises of a series combination of a first switch 144, 146, 148, 150 and a second switch 152, 154, 156, 158.

The switches 144, 146, 148, 150, 152, 154, 156, 158 are each formed of a combination of a transistor and a redundancy diode connected in antiparallel.

The control means of the transistors are not shown in FIG. 2.

Each switching circuit 130, 132, 133 is respectively joined to a different single main arm 106, 108, 110 and comprises a first diode 160, 162, 164 connected in direct from the output terminal 136 of the switching cell 142 of the emergency back up arm 112 to a connection point 170, 172, 174 respectively. Each connection point 170, 172, 174 respectively connects the associated switching cell 137, 138, 140 to the respective associated fuse 114, 118, 122, connected to the positive polarity terminal 134.

Each switching circuit 130, 132, 133 comprises a second diode 176, 178, 180 connected in direct from a connection point 182, 184, 186 joined to the output terminal 136 of the switching cell 142 of the emergency back up arm 112. Each connection point 182, 184, 186 respectively connects the associated switching cell 137, 138, 140 to the associated fuse 116, 120, 124, connected to the negative polarity terminal 135.

This configuration is ideal when the failure modes of switches and their associated electrical responses combined with the performance of the fuses enable the symmetrical isolation of any main arm.

Figure 3:
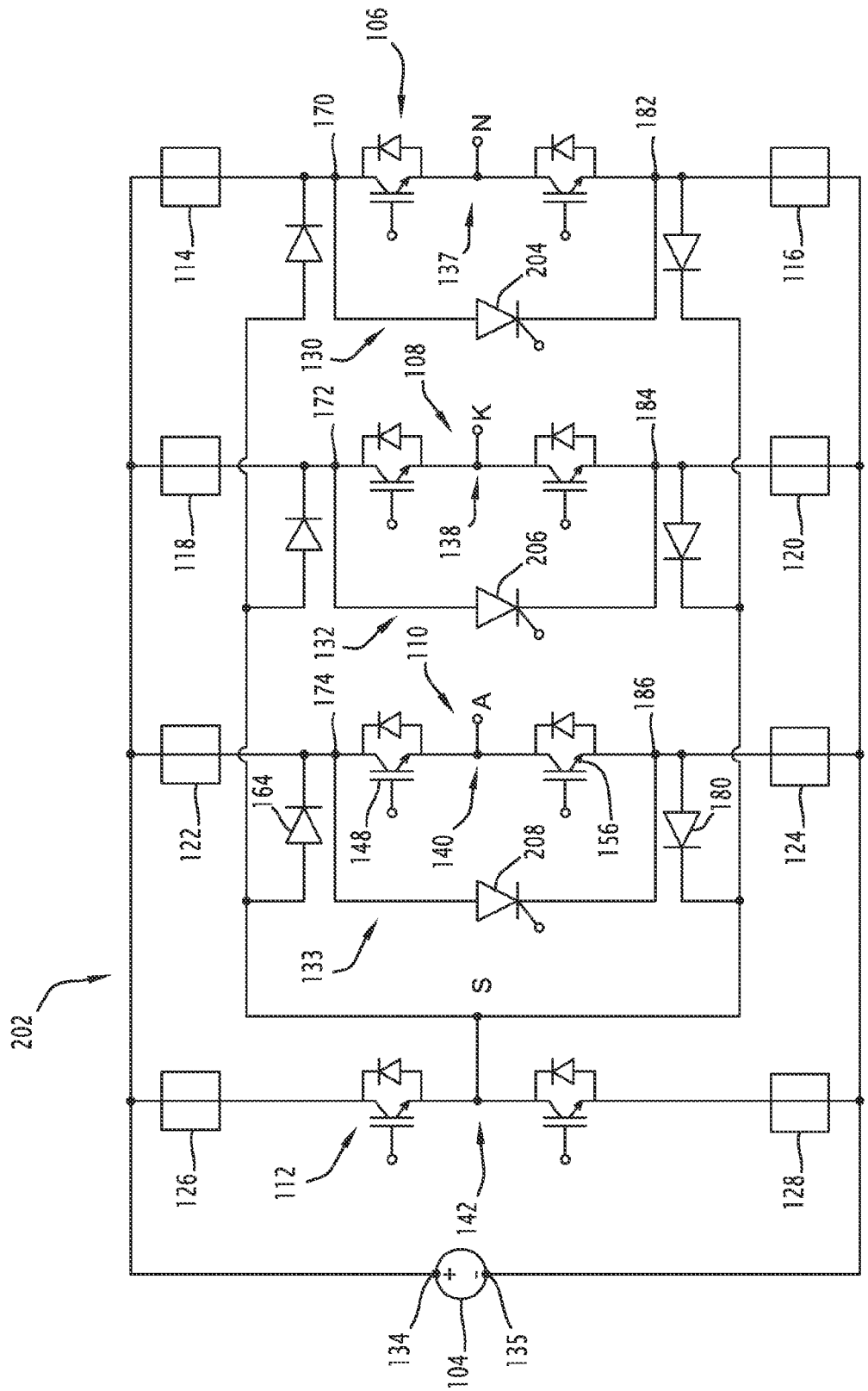
FIG. 3 is a circuit diagram of a variant of the inverter in FIG. 2.

According to FIG. 3, a variant of the inverter 102 is an inverter 202 comprising of the same components, designated by the identical references and the same arrangement of these components.

The inverter in addition includes three auxiliary thyristors 204, 206, 208 for aiding in the isolation of a main arm with associated control means not shown, each auxiliary thyristor 204, 206, 208 being joined to a different single main conversion arm 106, 108, 110.

Each auxiliary thyristor 204, 206, 208 is connected respectively between the connection points 170 and 182, 172 and 184, 174 and 186.

By way of an example, a non symmetrical isolation of the main conversion arm 133 takes place where only the fuse 122 through fusion has opened the circuit of the main arm on the side of the positive polarity terminal 134 and where the main arm remains connected to the negative polarity terminal 135 by means of the fuse 124 that has not blown. The fault having been detected and located in advance on the first arm 133, the thyristor 208 is then commanded into the conductive state in a manner such that the fuse 124 is short circuited in permanence either by means of the diode 180, or by means of the diode 164, of the auxiliary thyristor 208, connected in series, so as to blow and to finally obtain the symmetrical isolation of the main arm 133.

Furthermore, the arm 133 being completely isolated, the two diodes each being mounted on an associated transistor 148, 156 and the thyristor provides a conduction path between the output designated by S of the emergency back up switching cell 142, and the phase terminal designated by A of the load.

Figure 4:
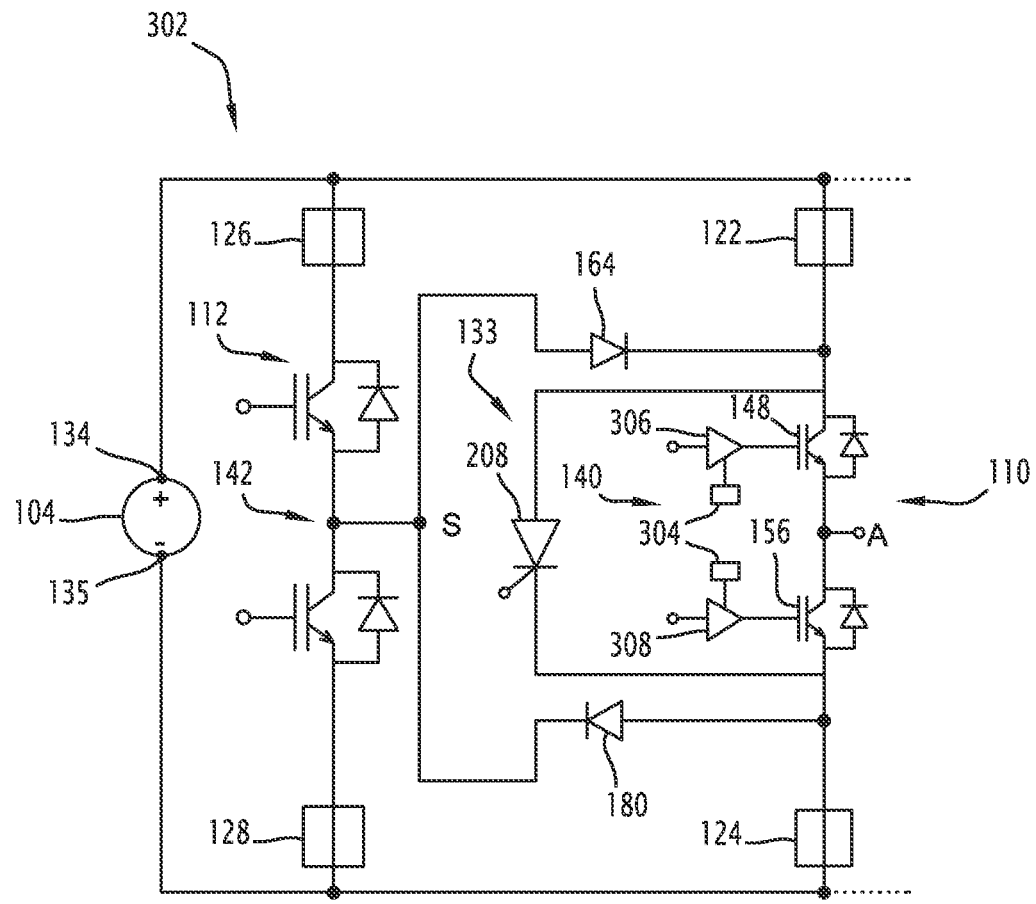
FIG. 4 is a partial circuit diagram of a variant of the inverter in FIG. 3.

According to FIG. 4, a variant of the inverter 202 is an inverter 302 in which each main arm includes a rapid cut-off protection device 304 integrated into two driving units 306, 308, referred to as "drivers", controlled transistor chips of the switching cell joined to the main arm.

Thus, where there appears to be some difficulty or risk of non-selective protection between the fuses and the bonding beams of chips in the lever mode (known as "crowbar"), due to a $I^2t$ that is too low or indeed, a fault resistance of a faulty transistor that is poorly controlled, it may be advisable to operate an isolation in two phases.

During a first asymmetric isolation phase of the switching cell, for example, the cell designated by 140, the defective switching cell 140 is isolated with the aid of the protection of the rapid circuit breaker 304 in built into the two driver units 306, 308 of the transistor chips.

During a second isolation phase subsequent to the first phase, which is symmetrical this time and through a different mesh, the switching cell is isolated using the auxiliary thyristor.

The emergency backup connection is implemented preferably by the redundancy diodes in order to maintain the transistors in an OFF state compatible with the circuit breaker mode.

Figure 5:
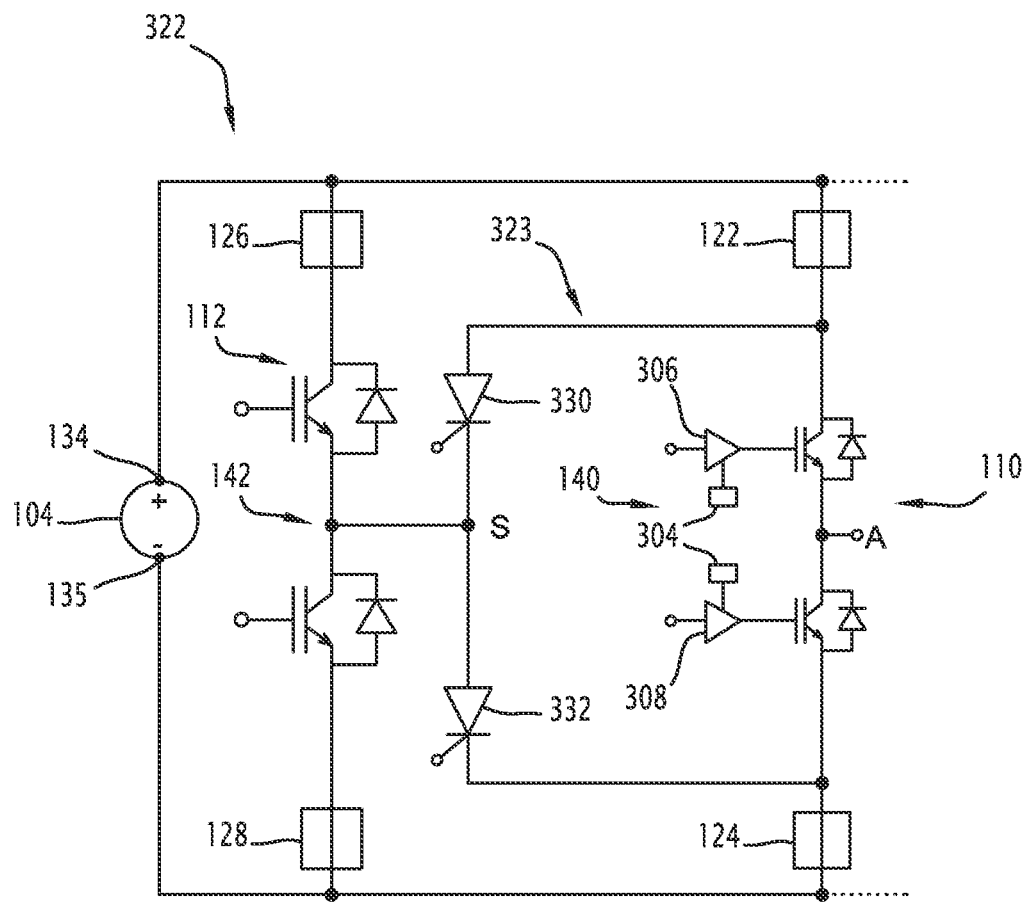
FIG. 5 is a circuit diagram of a variant of the inverter in FIG. 4.

According to FIG. 5, a variant 332 of the inverter 302 described in FIG. 4 is described in which, for each main arm, the two connection diodes are replaced each by a thyristor and the thyristor for aiding in the isolation of the arm is removed.

For example, in the new main arm 323 the only main arm shown in FIG. 5, and replacing the main arm 133 of FIG. 4, the diodes 164, 180 are replaced by two thyristors 330, 333 connected in series in the same direction of assembly as the thyristor of 208 in FIG. 4, the series assembly thus formed being connected in parallel between the two fuses 122 and 124.

The thyristor for aiding in the isolation 208 is removed.

Thus arranged, the two thyristors 330 and 332 perform the functions of switching connection and aiding in the isolation of the main arm 323, making it possible to save one electronic power component.

Figure 6:
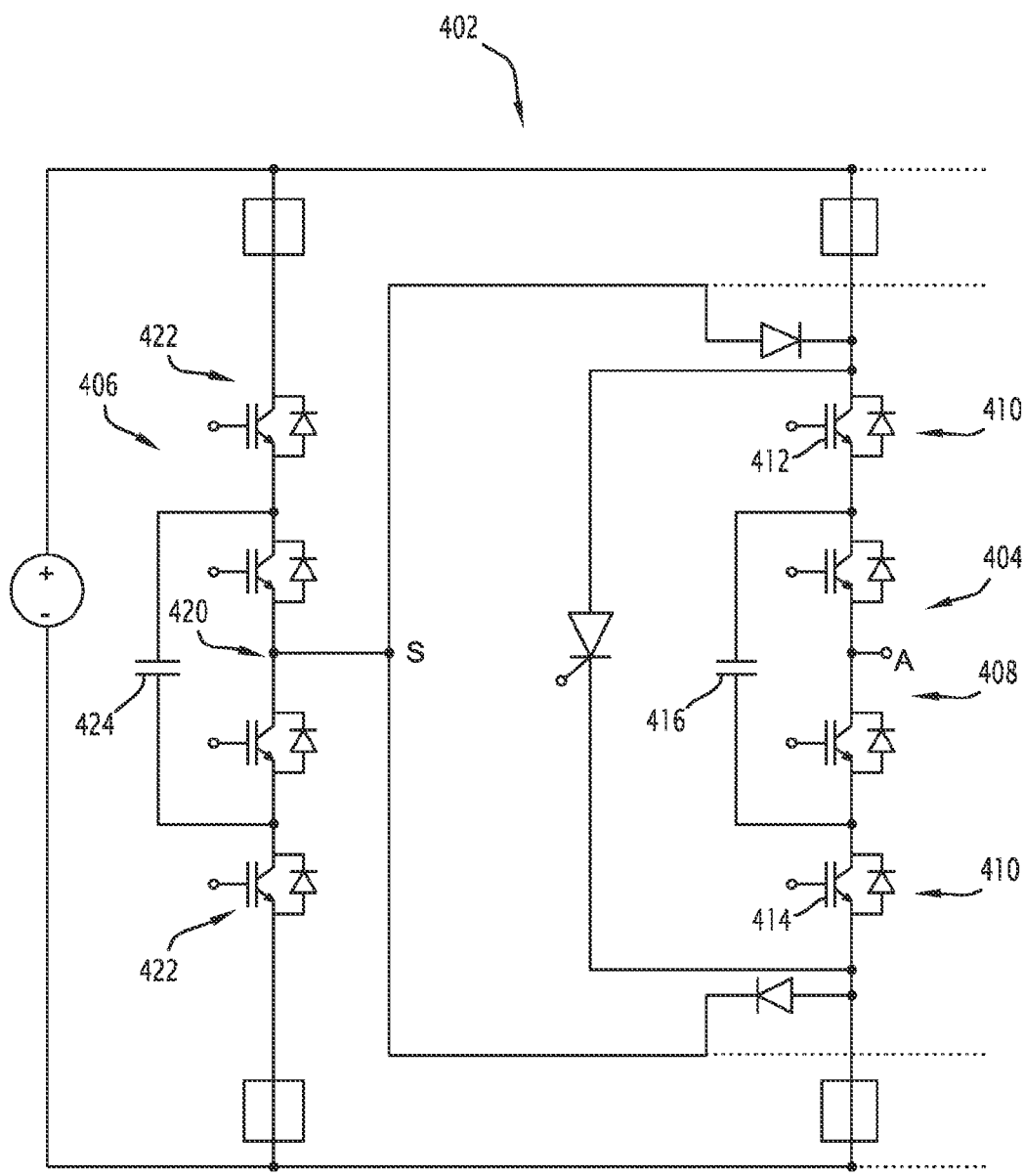
FIG. 6 is a circuit diagram of a second embodiment of the converter in FIG. 2, that of an inverter having multi level phases.

According to FIG. 6, as a variant to the inverters in FIGS. 2, 3, 4 and 5, an inverter 402 is a multi-level inverter with nested switching cell, and comprises at least one main arm 404 and an emergency back up arm 406 having identical structures.

Each main static conversion arm is a macro-cell, with two or more voltage levels, whatever be its internal structure, as long as it has only two connecting poles on the direct current side.

Here in FIG. 5, the main arm 404 includes two nested switching cells, a first internal cell 408 identical in structure to a switching cell of the inverter 202 depicted in FIG. 3, and a second external cell 410 comprising of two switches 412, 414 connected to the internal cell 408 while framing it.

The switches of the two switching cells 412, 414 are connected in series, and a capacitor 416 forming part of the main arm 404 is connected in parallel to the internal switching cell 408, the latter also forming the output switching cell of the main arm 404.

Here, the emergency back up arm 406 includes like the main arm two nested switching cells, an internal cell 420 and an external cell 422 and a capacitor 424 connected to the terminals of the internal switching cell 420.

By way of a variant, the emergency back up arm 406 comprises a single switching cell.

Figure 7:
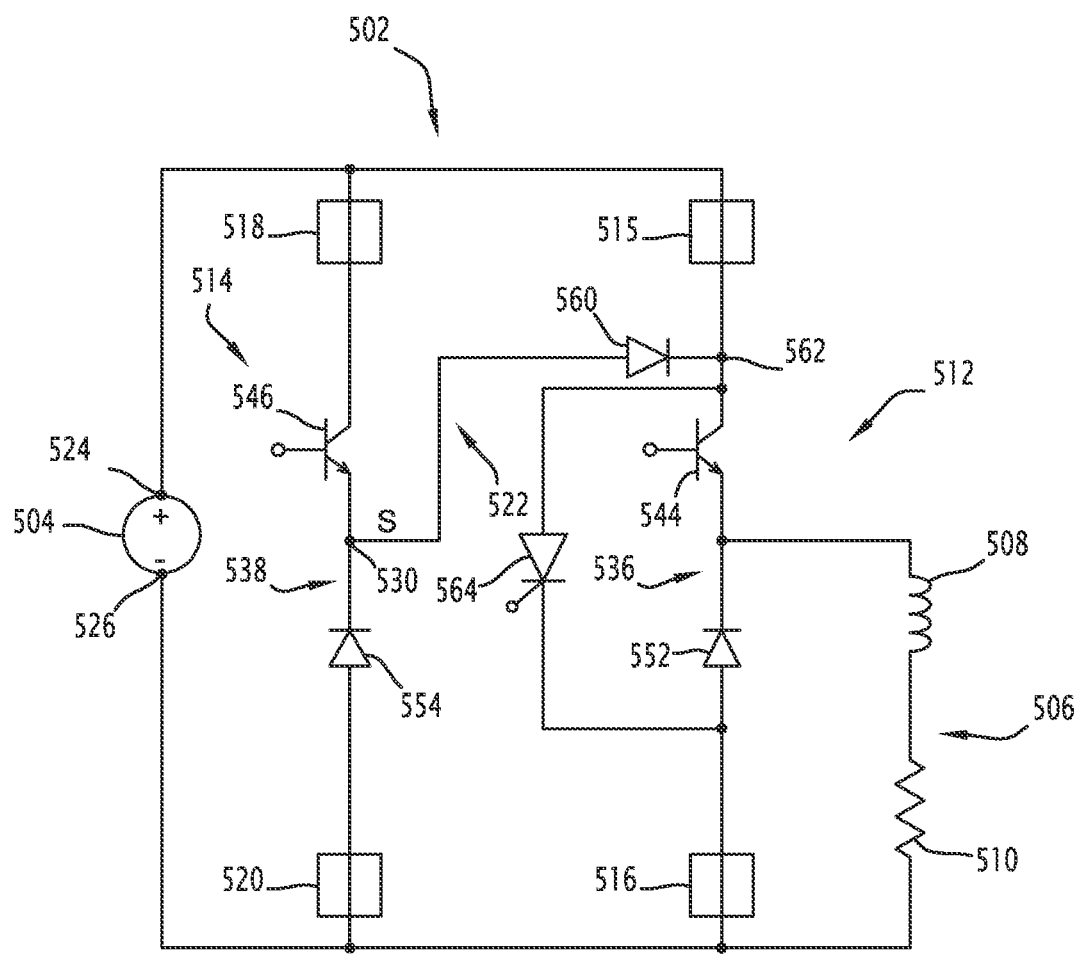
FIG. 7 is a circuit diagram of a second embodiment of the converter in FIG. 1, that of a unicellular chopper with redundancy provided by an emergency back up arm.

According to FIG. 7, the static converter is a step-down (buck) chopper 502 connected between a direct current DC voltage source 504 and an input load 506 of the type—coil winding of a motor for example, modelled by an inductor 508 and a resistor 510 connected in series.

The chopper 502 includes at least one main static conversion arm 512 and an emergency back up arm 514 having an identical structure to that of the main arm 512, a single main arm being shown in FIG. 6.

The inverter also includes fuses 515, 516, 518, 520 associated two by two in two separate pairs and a switching circuit 522.

The main arm 512 is connected between a single positive polarity terminal 524 and a single negative polarity terminal 526 of the source 504 by means of the pair of fuses 515 and 516.

The emergency back up arm 514 is connected between the positive polarity terminal 524 and the negative polarity terminal 526 of the source 504 by means of the pair of fuses 518, 520 and includes an output terminal 530.

The main arm 512 and the emergency back up arm 514 respectively comprise a single switching cell 536, 538 unidirectional in flow and of identical structure.

Each switching cell 536, 538 comprises of a series combination of a first switch 544, 546 and a second switch 552, 554, each first switch 544, 546 being formed by a different single transistor and each second switch 552, 554 being formed by a single diode.

The control means of the two transistors 544, 546 are not shown in FIG. 6.

The switching circuit 522, associated with the main arm 512, includes a diode 560 connected in direct from the output terminal 530 of the switching cell 538 of the emergency back up arm 514 up to the point of connection 562 of the switching cell to the fuse 515 connected to the positive polarity terminal.

Thus, unlike in the case of the inverter depicted in FIGS. 2 to 5, the switching cell 536 is unidirectional in power flow and being constituted by a single transistor 544 and a single diode 552 causing this time, an asymmetrical operation in failure regime.

In effect, if the initial failure of the diode indeed causes the "crow-bar" effect (lever effect) as desired to trigger the two fuses 515, 516 on the two poles like the inverter, the same would not apply if it is the transistor 544 that was initially faulty. The opposite diode 552 gets blocked, insolating the failure within the cell but leaving the load 506 permanently connected to the direct current voltage source 504. In the case of an initial load short circuit failure, the fuse 515 will isolate the main arm 512 without problem, in contrast, in the event of an initial failure involving the transistor 544 itself, it would require the fuse to be suitably dimensioned and designed to ensure protection with respect to the current overload in the load (as this moreover exists on some types of fuses of the Protistor™ brand).

If this condition is met, the redundancy principle presented for the inverter can be adapted directly to the case of the chopper.

In the contrary case, a thyristor for aiding in the isolation 564 is required to provoke the symmetrical isolation by the two fuses 515, 516.

Similar to the inverter described in FIG. 3, the auxiliary thyristor 564 also offers the advantage of a second conduction path putting into play only the conduction of the diode 552 of the switching cell 536, which is useful if the failure mode of the transistor is too resistive or indeed if the defect results in a lack of control over the transistor 544.

Figure 8:
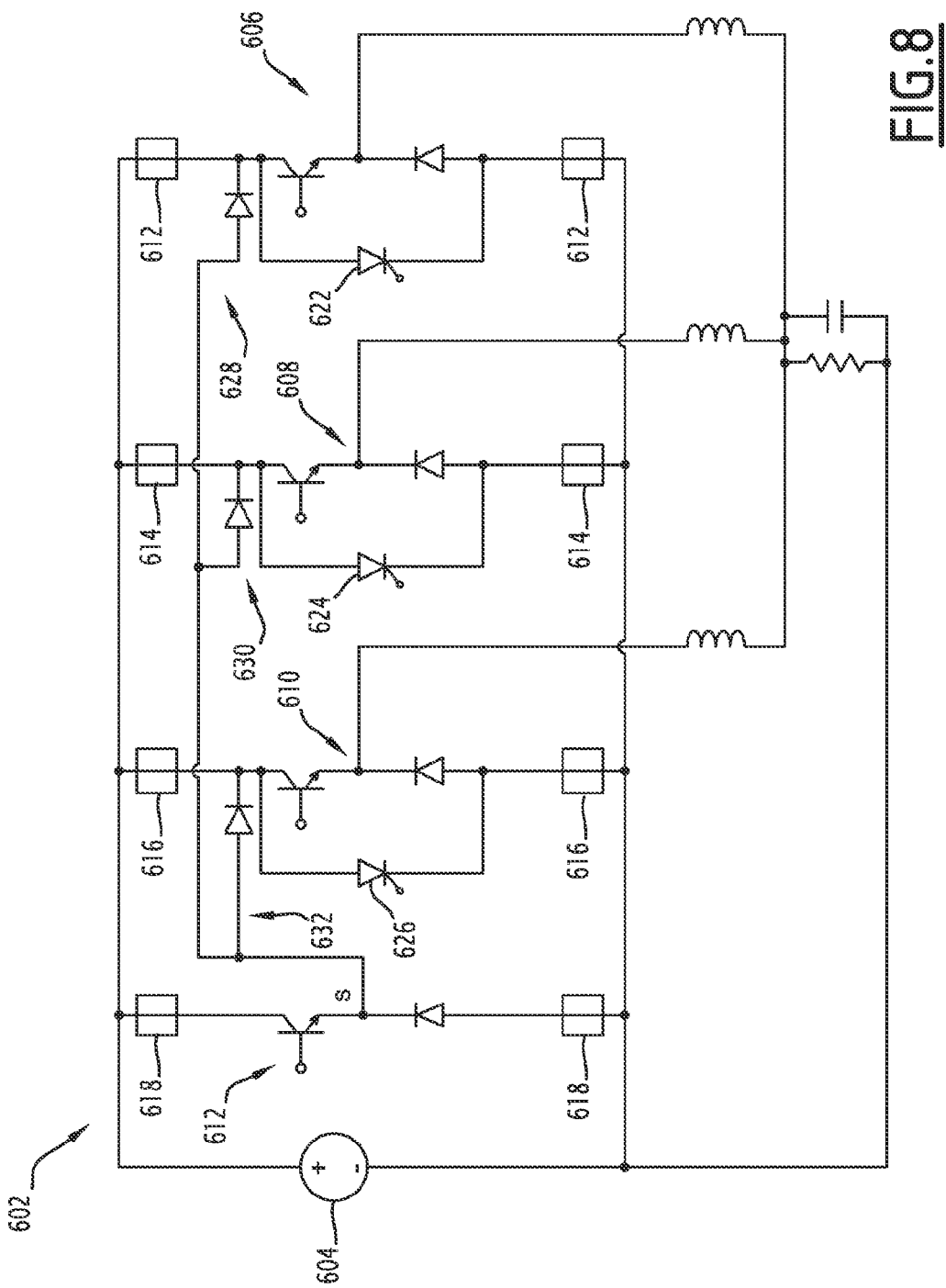
FIG. 8 is a circuit diagram of the third embodiment of the converter in FIG. 1, that of a static converter with three mono phase parallel choppers of the type described in FIG. 7 with a shared emergency back up arm.

According to FIG. 8, a static converter 602 with choppers in parallel comprises of at least two main conversion arms connected in parallel on a direct current voltage source 604, over here three main chopper arms 606, 608, 610 each identical to the main arm of the chopper described in FIG. 6.

The converter 602 includes an emergency back up arm 612 identical to the one as in FIG. 6 and four pairs of fuses 612, 614, 616, 618, each main arm 606, 608, 610 and the emergency back up arm 612 being nested within a different single pair of fuses.

Similarly, the converter 602 includes three auxiliary thyristors 622, 624, 626 for aiding in the isolation, each connected to a different single arm, and three switching circuits 628, 630, 632 associated one by one to a different main arm.

Similar to the polyphase inverter described in FIG. 3, the emergency back up arm 612 is shared by all of active switching cells forming the main arms 606, 608, 610 and becomes spontaneously connected in series with a switching cell that has become defective in order to provide emergency back up to the affected phase by means of the diode of the switching circuit and possibly the auxiliary thyristor thus serving as switching element, depending on the component that has become defective on the switching cell that has become faulty. For example, if the switching cell of the main arm 606 has become faulty, the switching circuit 628 and possibly the auxiliary thyristor 622 will enable the emergency back up arm to connect spontaneously in series to the faulty cell of the main arm 606.

The redundancy architecture ensures continuity of service without degradation of electrical performance in the event of the failure of a single main arm.

It should be noted that in the case of a connection through uncoupled inductors, the emergency back up remains operational if a second failure occurs on any cell. The two defective cells are then connected in parallel via their auxiliary diode and possibly their auxiliary thyristor; the same is applicable for connecting inductors. A derating of power must thus be applied so as to avoid overloading the emergency back up cell and not endanger the entire converter.

In the case of coupled inductors, the emergency back up cell could ensure the maintenance of the operation upon the first fault, a priori without additional precaution. Upon the second fault, the maintenance of a balanced continuous component of the clean current flow in the two inductors would necessitate maintaining the balanced continuous ampere turns and thus doubling the current in the emergency back up cell with a 100% overload in that cell. It seems more appropriate to reduce by half the continuous component of the current in the other active phases, ie a derating of power, in order to maintain a balanced continuous magnetic state across all of the coupled inductors, the emergency back up cell in this case being used at its rated (nominal) current.

Figure 9:
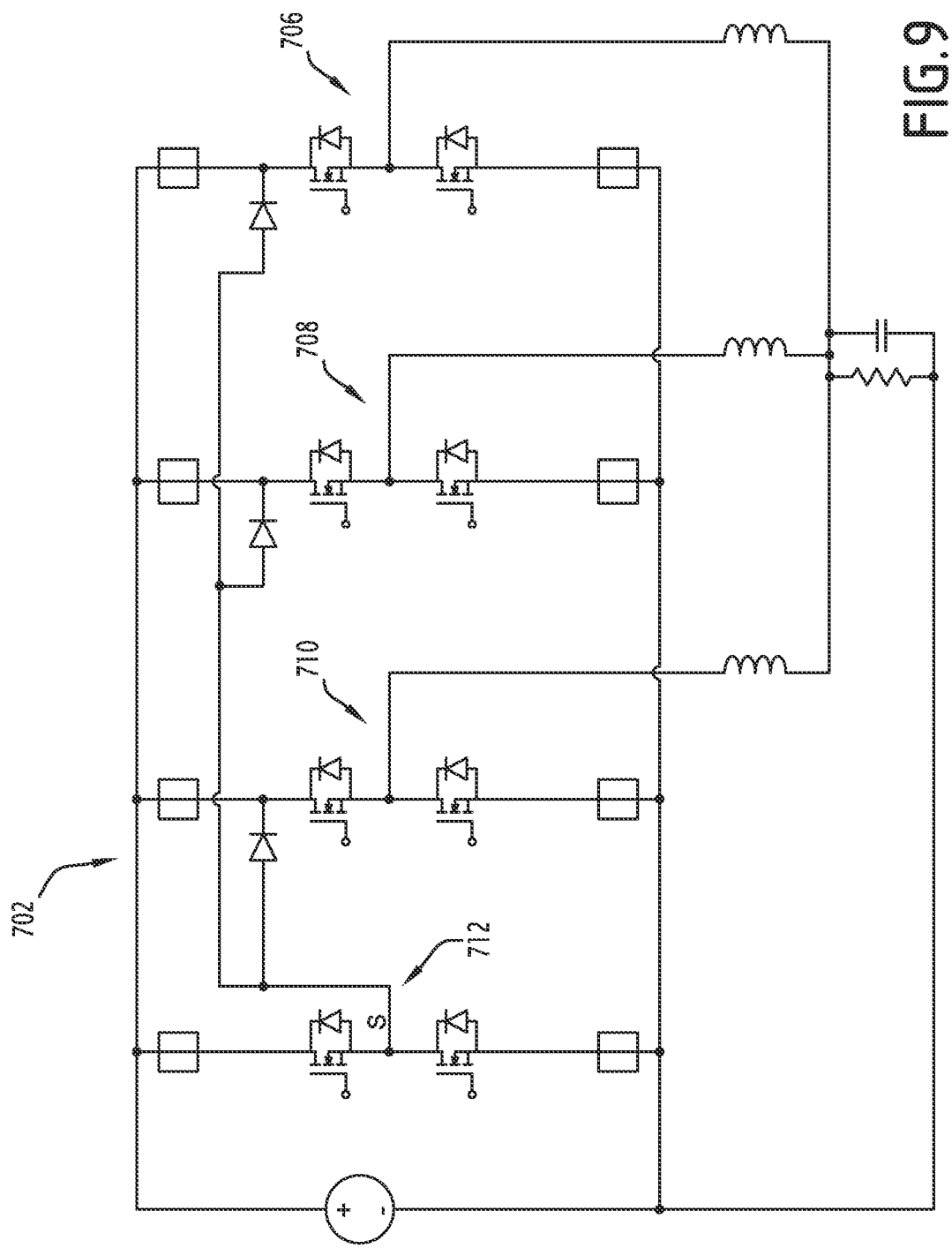
FIG. 9 is a circuit diagram of a variant of the converter of FIG. 8.

According to FIG. 9, a static converter 702 having architecture similar to that of the static converter in FIG. 7 is proposed in the specific case of low-voltage application.

The converter consists of three main conversion arms 706, 708, 710 and an emergency back up conversion arm 712.

The switches of the switching cells of all the arms 606, 608, 610, 612 in FIG. 8 have been replaced by MOS switches each formed by a combination of a MOS transistor with a diode connected in antiparallel. The auxiliary thyristors have been removed.

These switches may favourably be used in reverse conduction in the free wheel sequence (combination of the body diode and reverse channel conduction). The switching cells then have two transistors in series capable of triggering the two associated fuses with the crow-bar effect as in the case of an inverter described in FIG. 2. The auxiliary thyristors are therefore no longer necessary in this particular case.

Figure 10:
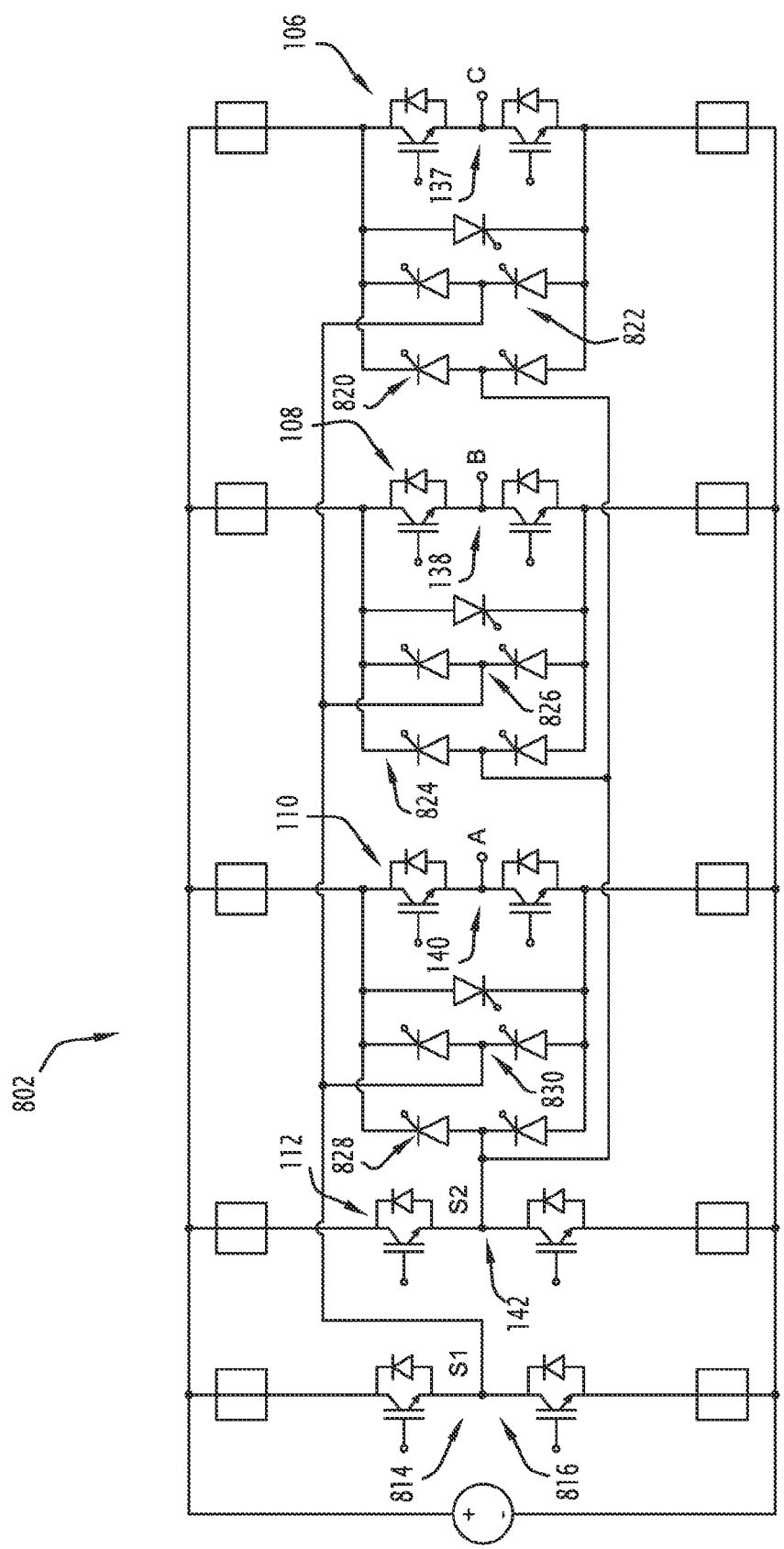
FIG. 10 is a circuit diagram of a fourth embodiment of the converter in FIG. 1, that of a three phase double fault tolerant inverter.

According to FIG. 10, an architecture of a three phase inverter 802 is proposed in which it is possible to ensure service continuity in the event of a double failure that is to say two failures distributed over two different main arms.

Indeed, in the previous drawings pertaining to the following converter types: inverter or chopper, each active output cell of an active main conversion arm has its diode switcher of which a common point is connected to the single output cell of the shared emergency back up arm. This may be considered as a "minimalist" approach insofar as the number of additional components is effectively minimised and the absence of a control electrode over these components is preferred for reasons of reliability and low additional costs even if the added components are dormant in passive redundancy mode.

Nevertheless, there is a price to be paid for this relative simplicity in terms of the absence of a second fault tolerance. Indeed upon the first fault, the output terminal of the faulty main arm corresponding to a phase finds itself supplied with power by the emergency back up output cell by means of its switcher, the other switchers in parallel continuing to remain blocked and properly isolating the other cells in parallel of the first fault even if the diodes undergo temporal variation of the voltage or dv/dt of the emergency back up output cell. Upon the second fault, on another output of another main arm corresponding to any other phase, the switching circuit concerned comes to spontaneously connect the other output to the same emergency back up output cell since the latter is common to all of the outputs corresponding to different phases thereby implementing the connection in parallel of the two faulty phases through their switchers and respective faulty components. It is difficult to imagine a viable three phase operation under these conditions.

However, it was seen that an operation with parallel load is possible with the architecture proposed in FIG. 7, even if the balancing of currents is to be studied on a case by case basis and especially in an experimental manner. That said, inasmuch as the fault resistances measured over the faulty chips of IGBT (Inverse Gate Bipolar Transistor) type are small compared to the resistance of the switching diodes in series, a balancing of currents may very well be expected to have taken place.

The architecture proposed according to FIG. 10 is a variant of that in FIG. 2 and allows for a second failure tolerance in all cases of application.

The proposed solution consists of inserting a second emergency back up arm 814, here formed by a single emergency back up cell. In order to be able to switch any emergency back up arm from among the two arms 112, 814 to any whichever of the active cells 137, 138, 140 forming a main arm 106, 108, 110 in a totally independent fashion, each active main cell 137, 138, 140, is seen to be provided with two respective switching circuits 820, 822; 824, 826; 828, 830 controlled in parallel enabling the switching of the faulty phase to one or the other of the emergency back up cells 142, 816.

This principle may be generalised to any whichever static converter of N active switching cells equipped with K switchers connected to K cells in emergency back up mode, with N and K being two integers greater than or equal to 2 and K being less than or equal to N.

This principle may also be generalised to any whichever converter such as described in FIG. 1 comprising a first number N greater than or equal to two, of the main switching arm, a second number K, of the emergency back up switching arm, that is greater than or equal to two, a same second number K of switchers, each switcher is joined to a separate main switching arm, the first number N being greater than or equal to the first number K.

Each switcher is an electric multi-pole comprising the second number K of connection elements and control means of associated thyristors, each connection element of a same switcher being a thyristor, each thyristor having an input connected to the output of a single and distinct emergency back up arm and an output connected to the first input of the main switching arm with which the switcher is associated.

The control means of thyristors of the switchers are configured in a manner such that when any which main switching arm connected to a switcher is defective, it is able to be backed up by any one of the emergency back up arms that have not yet become active.

Figure 11:
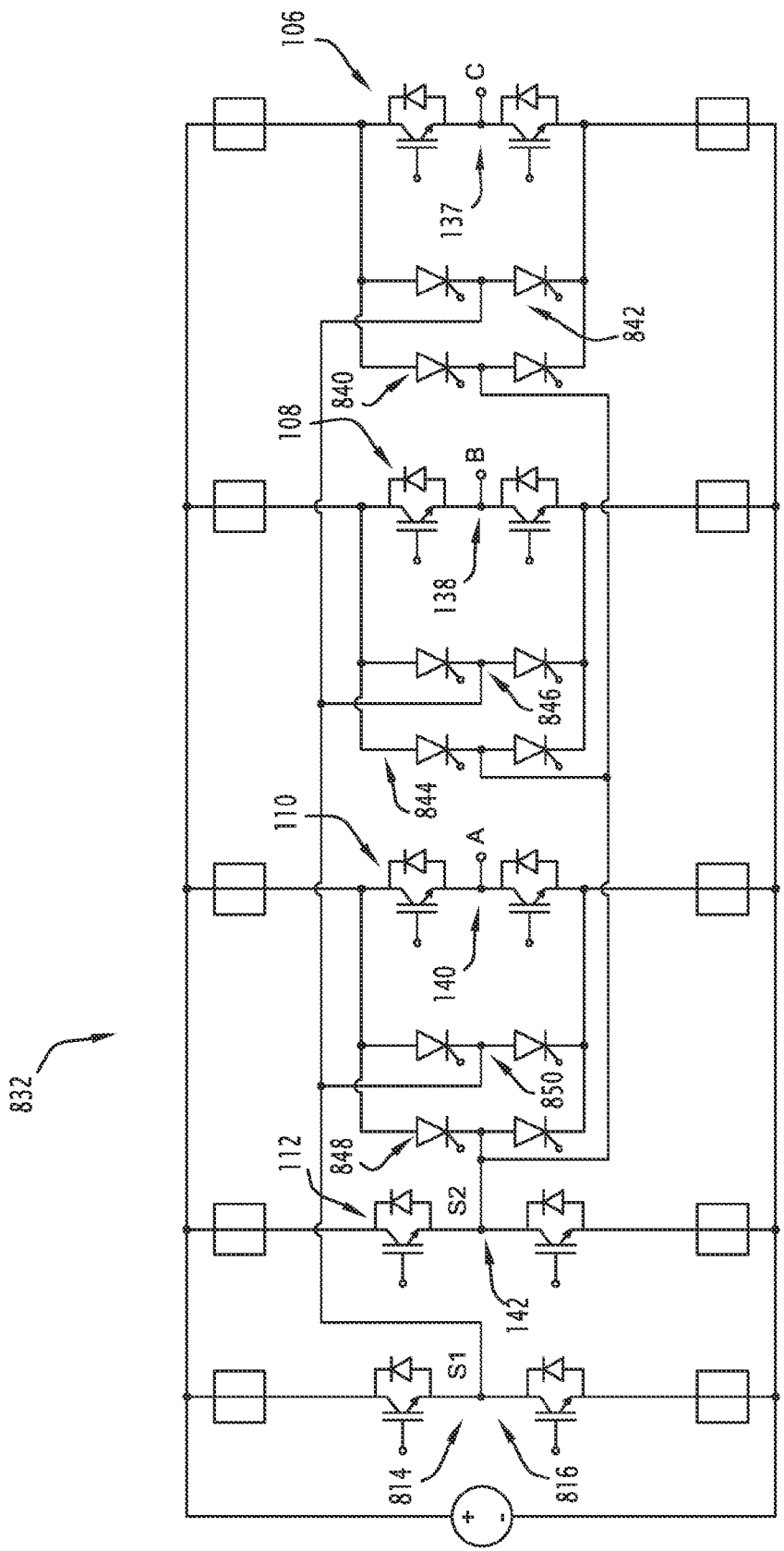
FIG. 11 is a circuit diagram of a variant of the inverter in FIG. 10.

According to FIG. 11, a variant of the converter in FIG. 10 is proposed in which the direction of assembly is reversed for all the thyristors constituting the connection elements of the switching circuits.

The thyristors for aiding in the isolation of the main arms are removed.

Thus, the connection elements provide the same switching function as that described for FIG. 10 but also the isolation function of the main arms. Thus, a saving is obtained in terms of thyristors for aiding in the isolation, which is three in number here.

Figure 12:
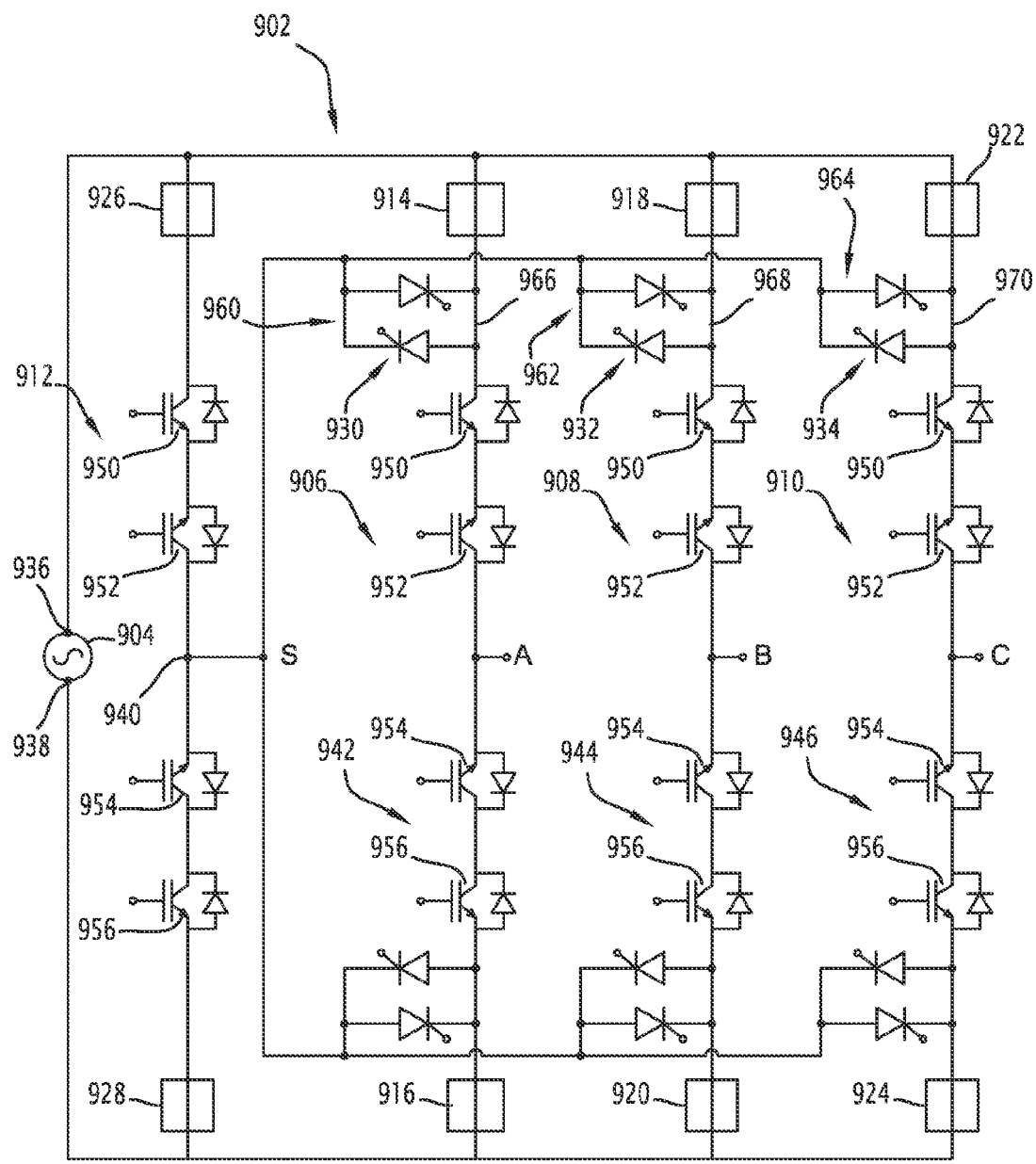
FIG. 12 is a circuit diagram of a fifth embodiment of the converter in FIG. 1, that of an AC/AC voltage converter.

According to FIG. 12, a static converter 902 of AC/AC type is connected between an alternating current AC voltage source 904 and a load not shown having three phase inputs designated by the letters A, B, C.

The converter 902 includes three main static conversion arms 906, 908, 910 and an emergency back up arm 912 of identical structure.

The converter 902 also includes isolation components 914, 916, 918, 920, 922, 924, 926, 928 which here are fuses and which are associated in two by two arrangement in four distinct pairs, and three switching circuits 930, 932, 934.

Each main arm 906, 908, 910 is connected between a first polarity 936 and a second polarity terminal 938 of the alternating current voltage source 904 by means of a different respective pair of fuses, the fuses 914, 916 for the arm 906, the fuses 918, 920 for the arm 908, and the fuses 922, 924 for the main arm 910.

The emergency back up arm 912 is connected between the first polarity terminal 936 and the second polarity terminal 938 of the source 904 by means of the pair of fuses 926, 928 and includes an output terminal 940.

Each main arm 906, 908, 910 and the emergency back up arm 912 each respectively comprise a pair 942, 944, 946 of the nested reverse biased switching cells.

Each pair 942, 944, 9946 of switching cells comprises a series combination of four switches 950, 952, 954, 956 assembled according to an alternating polarisation.

The switches 950, 952, 954, 956 are each formed of the combination of a transistor and a redundancy diode connected in antiparallel in relation to the direction of polarisation of the transistor.

The control means of the transistors are not shown in FIG. 12.

Each switching circuit 930, 932, 934 is respectively associated with a different single main arm 106, 108, 110 and comprises of a first pair 960, 962, 964 of thyristors assembled in inverse parallel connected from the output terminal 940 forming the centre tap of the emergency back up arm 912 to a connection point 966, 968, 970 respectively. Each connection point 966, 968, 970 respectively connects the associated main arm 906, 908, 910 to the respective associated fuse 914, 918, 922 connected to the first polarity terminal 936.

Each switching circuit 930, 932, 934 comprises of a second pair 974, 976, 978 of thyristors assembled in inverse parallel connected from the output terminal 940 forming the centre tap of the emergency back up arm 912 to a connection point 980, 982, 984 respectively. Each connection point 980, 982, 984 respectively connects the associated main arm 906, 908, 910 to the respective associated fuse 916, 920, 924 connected to the second polarity terminal 938.

Each switching circuit provides in addition to its switching function specific to an AC/AC type converter a function of aiding in the isolation of the main arm with which it is associated, if this is necessary.

Figure 13:
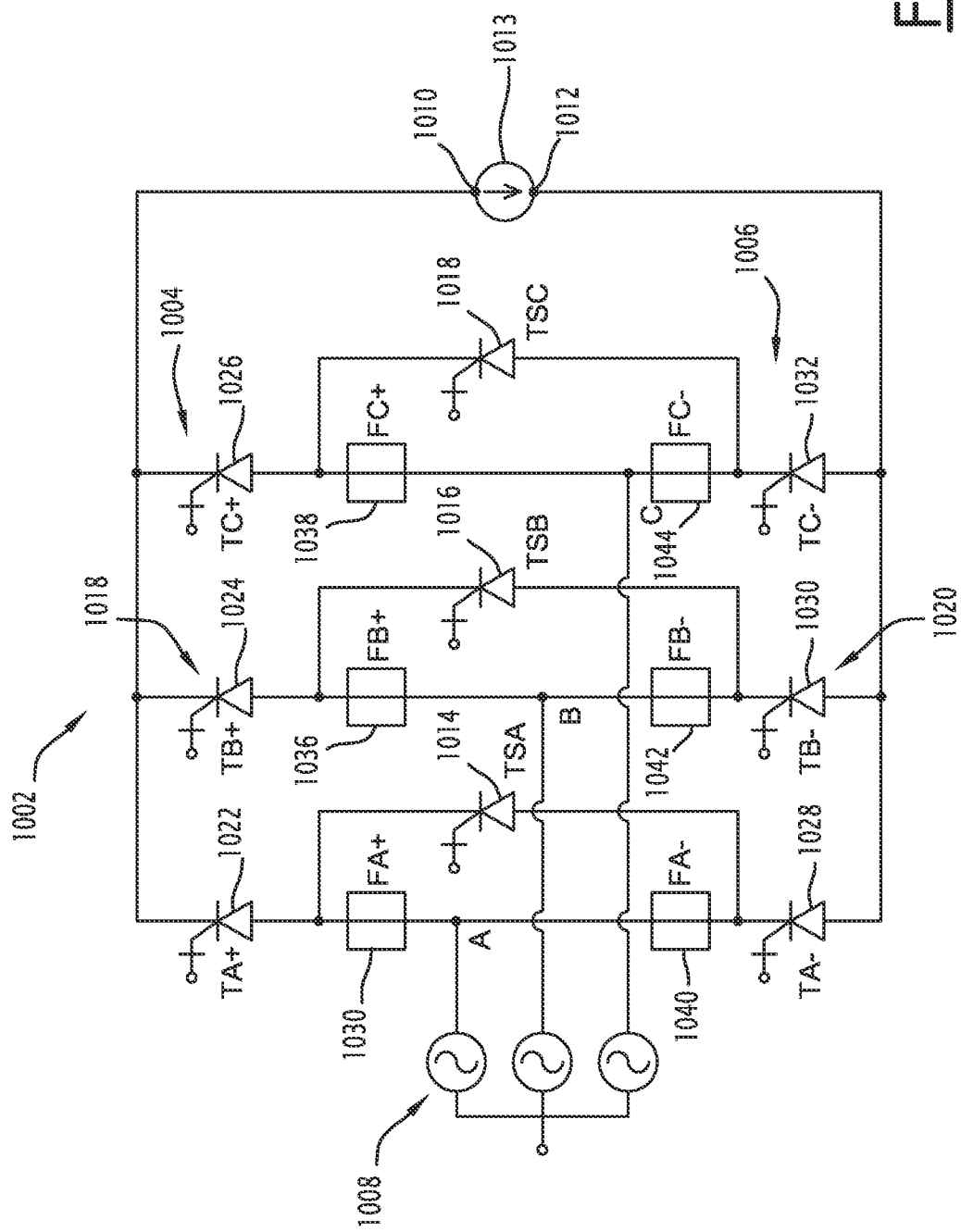
FIG. 13 is a circuit diagram of a multi cell rectifier using the concept of the invention supplied by a three phase power source.

According to FIG. 13, a three phase bridge rectifier 1002 in the general case consists of two main switching cells 1004, 1006 connected to the three output phases A, B, C of the alternating current AC source 1008, and to one of the two poles 1010, 1012 of the electrical load 1013 meant for receiving a direct current DC, and three emergency back up switches 1014, 1015, 1016 respectively designated by TSA, TSB, TSC.

Each main switching cell 1004, 1006 comprises here a first triplet and a second triplet 1018 1020 of main switches 1022, 1024, 1026, 1028, 1030, 1032.

The main switches 1022, 1024, 1026 of the first triplet 1018 designated also by TA+, TB+, TC+ are each connected to a respective phase which is associated with it, A, B, C, by means of different associated fuses 1034, 1036, 1038 again designated by FA+, FB+, FC+.

The main switches 1028, 1030, 1032 of the second triplet 1020 designated also by TA−, TB−, TC− are each connected to a respective phase which is associated with it, A, B, C by means of different associated fuses 1040, 1042, 1044 again designated by FA−, FB−, FC−.

Each emergency back up thyristor 1014, 1016, 1018 is connected in parallel on a different series circuit of two fuses, the fuses 1034, 1040 for the emergency back up thyristor 1014, the fuses 1036, 1042 for the emergency back up thyristor 1016, the fuses 1038, 1044 for the emergency back up thyristor 1018.

In the event of a failure of any main switch ie the loss of the reverse voltage withstand, the alternating current voltage source 1008 is short circuited between two of the three phases. The complete isolation of the faulty switching mesh is achieved thanks to the fuse inserted in series with each switch. Due to the positioning of the fuses on the side of the power source the emergency back up switches are shared by the two main switching cells.

During the first fault, for example on one of the switches TA+ or TB+ the switches TSA and TSB will come to be substitutes spontaneously in place of the switches TA+ and TB+ by the isolation of fuses FA+ and FB+, the fuses FA− and FB− ensuring last emergency backup protection in the event of a second default on switches TSA, TSB, TA− or TB−. If the second failure occurs on a different phase, here phase C, the continued operation is possible and obtained by the connection of TSC.

Similar to the case of the inverter and the chopper, the emergency back up switches are not subject to any constraint of dv/dt in normal operation but, more importantly, in this conversion mode, the voltage applied to the terminals of the three the emergency back up switches is zero; it therefore involves a very interesting cold passive redundancy. In normal operation, there is neither any leakage current nor loss.

Generally, a static converter, meant for converting electrical energy from a multi phase alternating current power source having a number n of phases higher or equal to two and a direct current electrical load with a controllable level of output current comprises:

a pair of switching cells formed of a first main switching unit and a second main switching unit, and fuses, the first switching cell comprising a number n of first unidirectional switches connected according to a same direction of current flow to a same first output terminal and the first associated control means, the first output terminal being capable of being connected to a first input terminal of the load, the second switching cell comprising of a number n of second unidirectional switches connected according to a same direction of current flow to a second output terminal and second associated control means, the second output terminal being capable of being connected to a second input terminal of the load, the first unidirectional switches being matched to the second unidirectional switches according to distinct pairs, the switching cells being configured through their associated control means so as to be active in a predetermined nominal mode of the converter.

The converter is characterised in that the fuses are divided into pairs of fuses, each pair of fuses is associated respectively with a different pair of switches, comprises, assembled in series, a first fuse and a second fuse each forming an electrical dipole and has a centre tap of connection of the two fuses between themselves, which is capable of being connected to a different output phase terminal of the power source, and each pair of fuses is connected in series between the first and the second unidirectional current switches of the pair of switches with which it is associated, the two unidirectional current switches being connected in series by means of the pair of fuses in the same direction, the converter comprises of unidirectional emergency back up switches, each emergency back up switch being connected in parallel to the terminals of a different pair of fuses, each switch of a switching cell is capable of presenting a stable permanent impedance less than around ten milliohms after having suffered a failure resulting from a thermal runaway or a short circuit, each fuse element connected to a main switch is dimensioned so as to isolate the main switch with which it is associated after the lapse of a first time period for the establishment of a stable low impedance failure mode on the faulty unidirectional switch and before the lapse of a second time period in order to avoid the creation of a circuit opening by the faulty switch, the control means of the emergency back up switch associated with the pair to which the switch that became faulty belongs and the control means of the emergency back up switch associated with the pair of switches corresponding to the immediately successive phase are configured in a manner so as to provide immediate emergency back up recovery without degrading the performance of the rectification.

Figure 14:
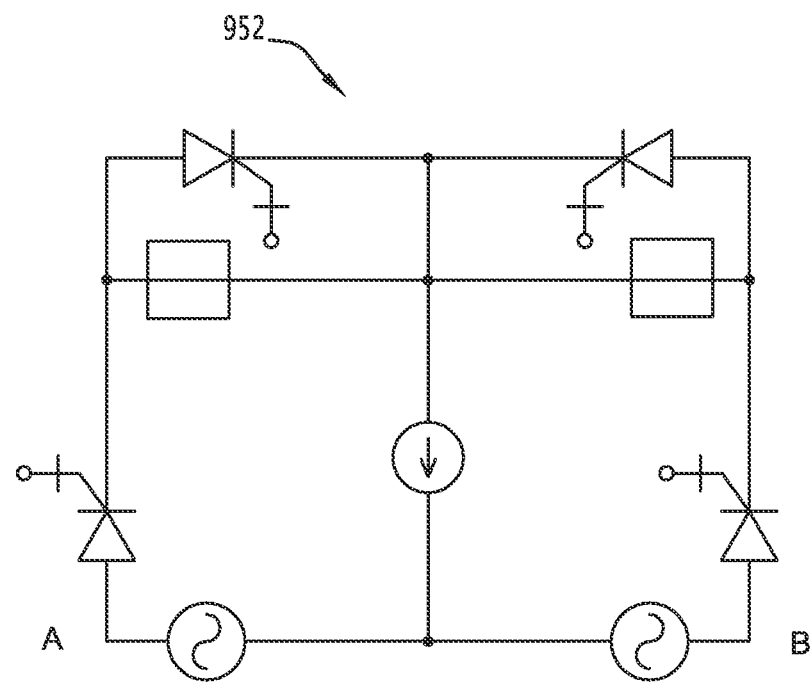
FIG. 14 is a circuit diagram of a single stage rectifier using the concept of the invention, supplied by a single phase power source.

According to FIG. 14, a unicellular rectifier 1052 is based on the same principle of connection and the same properties over the emergency back up switches as the two cell rectifier depicted in FIG. 13. Here, in principle, the fuses may be inserted interchangeably on the anode side or cathode side of the main switches.

Figure 15:
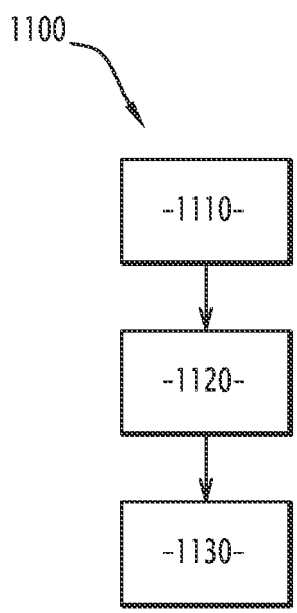
FIG. 15 is flowchart of a method for maintaining the operation of the converter in FIG. 1.

According to FIG. 15, a method for maintaining the continuity of service 1100 of a converter described in FIGS. 1 to 12 comprises of the following steps.

In a first step 1110, the control means of the controlled switches of the switching cells of the main arms are configured in a manner such that the static converter operates in a nominal manner on the main arms when none of the power components forming the main arms is defective.

In a next step 1120, when a fault occurs on a switch of a main cell, all the switches of the main arm to which the defective switch belongs and connected in series are short circuited for a time period t for obtaining the isolation of the main arm that has become faulty, greater than a first time period t1 in order for the main arm to attain a stable and permanent conductive state at very low impedance, of less than a few tens of milli-ohms, and less than a second time period t2 below which the integrity of the components of the defective main arm is preserved as well as the conductive state attained by the defective main arm.

In a next step 1130, the emergency back up switches configured in the same configuration as that of the switches of the faulty main arm are automatically connected by the switching circuit of the faulty main arm that became a stable conductor.

By way of a variant, step 1110 is preceded by a preliminary step in which, when the converter is operating normally, that is to say, when there is no failure, the control means 58 of the switches of the emergency back up arm 18 are configured in a manner such that emergency back up arm is placed in a standby state with minimum stress and constraints on the power components.

For example, in this preliminary step the control means 58 of the switches of the emergency back up arm 18 are configured in a manner such that its transistors and its diodes are kept in a locked static state.

In this same variant, the following steps are implemented at same time as the step 1120. The means for detection and location 24 detect and locate the main conversion arm that became faulty and command the means of control of the emergency back up switches of the emergency back up arm to adopt the same control configuration as that of the switches of the main arm that became faulty in normal operation.

Figure 16:
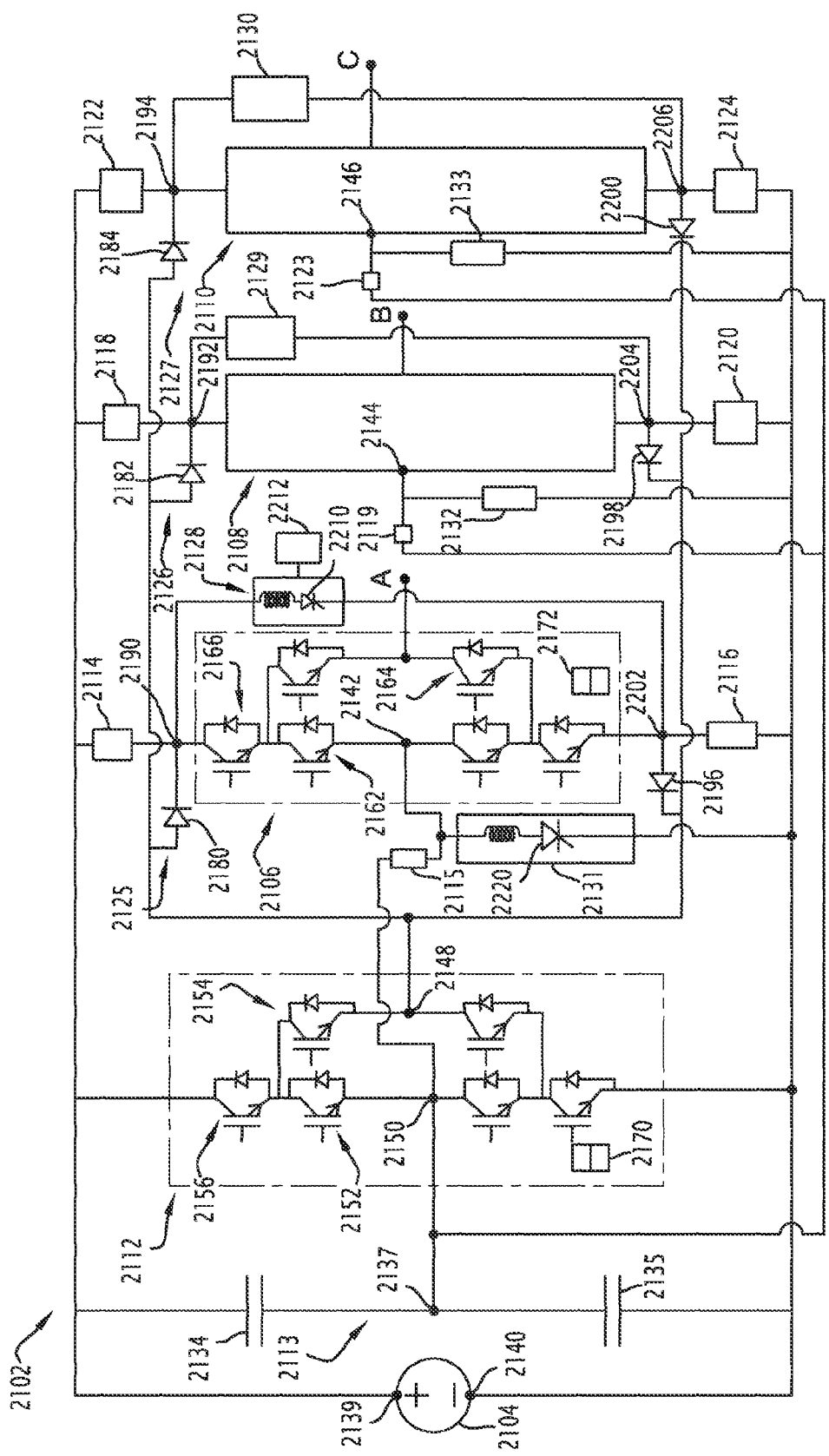
FIG. 16 is a circuit diagram of an Active Neutral Point Clamped (ANPC) three phase inverter.

According to FIG. 16, the static converter of FIG. 1 is a three phase three level ANPC inverter 2102 imposed by regulation of the neutral input point, the acronym ANPC stands for Active Neutral Point Clamped.

The article by T. Bruckner and S. Bernet entitled "Loss balancing in three-level voltage source inverters applying Active NPC switches" pages 1135-1140, IEEE 2001 describes a three phase three level ANPC inverter imposed by regulation of the neutral input point without emergency back up arm.

The inverter 2102 whose three output phases are designated respectively by the letters A, B, C is connected between a direct current voltage source 2104 and a three phase input load not shown The inverter 2102 includes three main static conversion arms 2106, 2108, 2110 and an emergency back up arm 2112 of identical structure.

The inverter 2102 also includes a capacitive divider bridge 2113 with centre tap (mid point) for creation of a neutral point, and isolation components 2114, 2115, 2116, 2118, 2119, 2120, 2122, 2123, 2124 which here are fuses and which are associated in three by three format in three distinctly separate triplets (2214, 2115, 2116), (2118, 2119, 2120), (2122, 2123, 2124), three switching circuits 2125, 2126, 2127, three circuits 2128, 2129, 2130 for aiding in the isolation of a main arm of the source, and three circuits 2131, 2132, 2133 for aiding in the isolation of a main arm of the neutral point.

The inverter 2102 also includes means for detection and location of a faulty main arm not shown in FIG. 16.

The capacitive divider bridge 2113 comprises of two capacitors 2134, 2135 of the same value, connected to each other in series by one of their respective ends at a centre tap 2137 forming a neutral connection point of the inverter.

The series circuit formed by the two capacitors 2134, 2135, is connected through the remaining ends of the two capacitors between a single positive polarity terminal 2139 and a single negative polarity terminal 2140 of the source 2104

Each main arm 2106, 2108, 2110 is connected between the single positive polarity terminal 2139 and the single negative polarity terminal 2140 of the source 2104 by means of a different respective pair of fuses, each pair belonging to a separate triplet, the fuses 2114, 2116 for the arm 2106, the fuses 2118, 2120 for the arm 2108 and the fuses 2122, 2124 for the main arm 2110.

Each main arm 2106, 2108, 2110 is connected to the centre tap of a capacitive divider bridge at a respective input point 2142, 2144, 2146 of the neutral connection of the main arm by means of the respective remaining fuse 2115, 2219, 2123 of the associated triplet (2214, 2115, 2116), (2118, 2119, 2120), (2122, 2123, 2124).

The emergency back up arm 2112 is connected between the positive polarity terminal 2139 and the negative polarity terminal 2140 of the source 2104. It comprises an output terminal 2148 and an input point 2150 of the neutral connection of the emergency back up arm.

Each main arm 2106, 2108, 2110 and the emergency back up arm 2112 includes three different switching cells of which two internal switching cells are connected in parallel to each other and nested in the remaining switching cell.

Here in FIG. 16, only the switching cells of the emergency back up arm 2112 and of the main arm 2106 are shown, the architecture of the two other main arms 2108, 2110 in terms of switching cells being identical.

Each switching cell comprises of a series combination of a first switch and a second switch with a corresponding centre tap.

The emergency back up arm 2112 comprises of a first internal switching cell 2152 whose associated centre tap is the input point 2150 of neutral connection, a second internal switching cell 2154 whose centre tap is the output point 2148 of the emergency back up arm 2112. The first and second internal cells 2152, 2154, connected in parallel, are nested in a third switching cell 2156 of which a different switch is connected to the first and second polarities 2139, 2140.

The main arm 2106 comprises of a first internal switching cell 2162 whose associated centre tap is the input point 2142 of neutral connection, a second internal switching cell 2164 of which a centre tap is the output phase point A of the main arm 2106. The first and second internal cells 2162, 2164, connected in parallel, are nested in a third switching cell 2166 of which a different switch is connected to the first and second polarities 2139, 2140 by means of the fuses 2114, 2116 respectively.

The switches of the switching cells are each formed by a combination of a transistor and a redundancy diode connected in antiparallel.

Only the control means of the transistors of the emergency back up arm 2112 and of the main arm 2106 are shown in FIG. 16 in the interests of ensuring readability and are respectively designated by the reference 2170 and 2172.

Each switching circuit 2125, 2126, 2127 is respectively associated with a different single main arm 2106, 2108, 2110 and includes a first diode 2180, 2182, 2184 connected in direct from the output terminal 2148 of the second internal switching cell 2154 of the emergency back up arm 2112 to a connection point 2190, 2192, 2194 respectively. Each connection point 2190, 2192, 2194 respectively connects the third external switching cell associated with a main arm 2106, 2108, 2110 to the respective associated fuse 2114, 2118, 2122 connected to the positive polarity terminal 2139.

Each switching circuit 2125, 2126, 2127 comprises a second diode 2196, 2198, 2200 connected in direct from a connection point 2202, 2204, 2206 joined to the output terminal 2148 of the internal switching cell 2154 of the emergency back up arm 2112. Each connection point 2202, 2204, 2206 respectively connects the third external switching cell associated with a main arm 2106, 2108, 2110 to the respective associated fuse 2116, 2120, 2124, connected to the negative polarity terminal 2140.

Each circuit 2128, 2129, 2130 for aiding in the isolation of a main arm of the auxiliary source 2104 is connected respectively between the connection points 2190, 2192, 2194 and 2202, 2204, 2206.

The three circuits 2128, 2129, 2130 for aiding in the isolation of a main arm of the source 2104 are made using three auxiliary thyristors of which only the one for the circuit 2128 associated with the main arm 2106 and designated by the reference 2210, is shown in FIG. 16.

Each thyristor used for aiding in the isolation of a main arm of the source 2104, joined to a different single main conversion arm 2106, 2108, 2110, is configured so as to isolate the associated main arm in the case where the arm becomes faulty, with the associated control means, shown only in FIG. 16 for the main arm 2106 and designated by 2212.

The three circuits 2131, 2132, 2133 for aiding in the isolation of a main arm of the neutral point are connected here directly and respectively between the neutral input point associated with a main arm and the negative polarity terminal 2140.

By way of a variant, the three circuits 2131, 2132, 2133 for aiding in the isolation of a main arm of the neutral point are connected directly and respectively between the neutral input point associated with a main arm and the positive polarity terminal 2139.

The three circuits 2131, 2132, 2133 for aiding in the isolation of a main arm of the neutral point are made using three auxiliary thyristors of which only the one for the circuit 2131 associated with the main arm 2106 and designated by the reference 2220, is shown in FIG. 16.

Each thyristor used for aiding in the isolation of a main arm of the neutral point, joined to a different single main conversion arm 2106, 2108, 2110, is configured so as to isolate the associated main arm in the case where the arm becomes faulty, with the associated control means, not shown in FIG. 16.

It is to be noted that the variants of the embodiments of the isolation components, switching circuits, circuits for aiding in the isolation, as described for FIGS. 3 to 5 may also be used.

During normal operation, that is to say, in the absence of fault on each main arm, the means for controlling the switches of the switching cells of the main arms are configured in a manner such that the inverter operates according to a conventional ANPC mode.

In case of a failure on any main arm, that is to say, on any phase whichever, the diagram proposed here of the complete isolation of the faulty main ANPC arm and its connection to a shared emergency back up arm by using a switching circuit that may be limited to two diodes, makes it possible to compensate for any internal fault on the inverter while maintaining emergency mode operating at 100% of rated voltage and power without having to over-dimension in terms of voltage the components of the main arms and the emergency back up arm.

By way of a variant, the ANPC type static converter in FIG. 16 is replaced by a NPC type three phase inverter, the NPC acronym meaning Neutral Point Clamped. In the NPC type three phase inverter, the first internal switching cells of any arm of the ANPC three phase inverter shown in FIG. 16 are each replaced by a different series of two diodes polarised in the same direction, the common point of the series of two diodes being connected to the neutral point isolation circuit associated with the main arm.

By way of a variant, the number of phases of the ANPC or NPC type inverter is arbitrary.

By way of a variant, and as a generalisation of an ANPC or NPC type inverter, the static converter is an inverter with imposition of a power supply centre tap, configured to be connected to a direct current voltage source and for supplying to an electrical load an alternating current over at least one phase.

The inverter includes a capacitive divider bridge, configured to provide an input power supply voltage centre tap.

Each main arm, associated with a phase, and the emergency back up arm comprises a separate input terminal for imposition of voltage centre tap.

For each phase and each associated main arm, the inverter comprises a component for isolation of the main arm from the centre tap of the capacitive divider bridge, connected to the input terminal for imposition of voltage centre tap on the main arm.

The first input terminal and the second input power supply terminal of any main arm are connected respectively to the first positive polarity and to the second negative polarity of the power source through a different pair of components of isolation from the source.

Each switching cell of a main arm or emergency back up arm includes a pair of bidirectional power switches connected in series, each bidirectional power switch being formed by a controlled switch and an associated diode connected in antiparallel, each controlled switch being an element included in the assembly consisting of thyristors, IGBT transistors, and MOS transistors.

Each main arm and the emergency back up arm comprises of a different output switching cell having a connection terminal at its two switches forming an output terminal of one phase (A), and includes a different input terminal for imposition of a centre tap.

The switching circuit comprises a first uncontrolled unidirectional current flow semiconductor connection element and a second uncontrolled unidirectional current flow semiconductor connection element, the first connection element being connected in direct from the output of the emergency back up arm to the first input terminal of the main arm, the second connection element being connected in reverse from the output of the emergency back up arm to the second negative input terminal of the main arm.

The means for controlling the switching cells of the main arm or arms are configured in a manner such that the converter operates as inverter over one or more phases when all main arms function without fault.

The invention claimed is:

1. A static converter for a conversion of electrical energy between a power voltage source and an electrical load comprising:
    a main static conversion arm comprising of at least one electronic switching cell with semiconductors equipped with associated control means, a first input terminal and a second power supply input terminal capable of being connected respectively to a first polarity and a second polarity of the power voltage source, an output terminal connected to an output switching cell and suitable for being connected to the electrical load, each switching cell being configured through the associated control means of the switching cell to be active in a predetermined nominal mode of the static converter,
    a pair of isolation components, associated with the main static conversion arm, formed of a first isolation component and a second isolation component each forming a dipole, the first isolation component and the second isolation component being connected directly and respectively to the first terminal and to the second power supply input terminal of the main static conversion arm,
    an emergency back up conversion arm consisting of at least one electronic switching cell with semiconductors equipped with associated control means, a first input terminal and a second power supply input terminal, suitable for being connected respectively to the first polarity and the second polarity of the power voltage source, an output terminal connected to an output switching cell, and
    an electronic semiconductor switching circuit having a connection element connected between the output terminal of the emergency back up conversion arm and an input terminal of the main static conversion arm from among the first input terminal and the second power supply input terminal of the main static conversion arm,
    the at least one electronic switching cell of the main static conversion arm connected in series between the first input terminal and the second power supply input terminal of the main static conversion arm are each capable of providing a stable permanent impedance less than a few tens of milli-ohms when the main static conversion arm has experienced a failure resulting from a thermal runaway or a short circuit in one of the semi-conductor components of the main static conversion arm, the pair of isolation components of the main static conversion arm are dimensioned in a manner so as to isolate the main static conversion arm after a lapse of a first time period (t1) for an establishment of a stable low impedance failure mode on the at least one electronic switching cell of the main static conversion arm connected in series and before a lapse of a second time period (t2) to avoid a creation of a circuit opening on the main static conversion arm,
    the associate control means of the at least one electronic switching cell of the emergency back up conversion arm are capable of being deployed after the isolation of the main static conversion arm that has become faulty so as to replace the main static conversion arm partially or entirely,
    the connection element is configured to be in a locked state when the main static conversion arm is active in the predetermined nominal mode and to be in a conductive state when the main static conversion arm has become faulty and the emergency back up conversion arm has become active.

2. The static converter according to claim 1, wherein the connection element is an element that is included in an assembly consisting of a diode, a thyristor, a combination of two thyristors connected in inverse parallel (head to tail) and a transistor.

3. The static converter according to claim 1, wherein the semiconductors of the at least one electronic switching cell of the emergency back up conversion arm are configured so as to be in the locked state when the main static conversion arm is active in the predetermined nominal mode and to replace the main static conversion arm partially or entirely after isolation of the main static conversion arm that has become faulty.

4. The static converter according to claim 1, comprising means for aiding in the isolation of the main static conversion arm, the isolation aiding means comprising;
- an auxiliary thyristor or a combination of two auxiliary thyristors assembled in inverse parallel, connected in parallel to the first input terminal and to the second power supply input terminal of the main static conversion arm, an auxiliary thyristor being connected when the voltage source is a direct current source and a combination of two auxiliary thyristors connected in inverse parallel being used when the power voltage source is an alternating current source, and
- a control means of the auxiliary thyristor or of the two auxiliary thyristors configured in a manner such that if a faulty main static conversion arm is not symmetrically isolated by the pair of isolation components that are associated with it, it creates a short circuit at the output terminal of the electrical load in order to induce a symmetrical isolation by each isolation component of the pair of isolation components.

5. The static converter according to claim 4, comprising for each at least one electronic switching cell of the main static conversion arm, associated rapid protection means capable of detecting an intolerable short circuit current flowing through the at least one electronic switching cell in comparison to a predetermined threshold value of a current and capable of triggering an opening of the at least one electronic switching cell after the detection of the predetermined threshold value of the current being exceeded.

6. The static converter according to claim 1, further comprising means for detecting a faulty main static conversion arm that are capable of commanding the associate control means of the at least one electronic switching cell of the emergency back up conversion arm to adopt same control configuration as the faulty main static conversion arm.

7. The static converter according to claim 1, wherein
the static converter comprises at least two main static conversion arms
each of the at least two main static conversion arms being identical in structure and including at least one electronic switching cell equipped with associated control means, a first input terminal and a second power supply input terminal capable of being respectively connected to the first polarity and the second polarity of the power voltage source, a phase output terminal connected to an output switching cell capable of being connected to a separate and distinct phase of the electrical load, each of the at least one electronic switching cell being configured through associate control means of the at least one electronic switching cell so as to be active in the predetermined nominal mode of the static converter,
the static converter comprises, for each main static conversion arm, of a pair of associated isolation components that are formed of a first isolation component and a second component isolation each forming a dipole, the first isolation component and the second isolation component being directly and respectively connected to the first input terminal and the second power supply input terminal of the associated main static conversion arm,
the static converter comprises a single emergency back up conversion arm having at least one output switching cell and an output terminal connected to the output switching cell, and
the static converter comprises, for each of the at least two main static conversion arms, an associated switching circuit having a connection element connected between the output terminal of the single emergency back up conversion arm and the first input terminal of the associated main static conversion arm,
the static converter comprises, for each main static conversion arm, means for detection and location of a faulty main static conversion arm that are capable of commanding the associate control means of the switching cells of the single emergency back up conversion arm to adopt same control configuration as the faulty main static conversion arm that has been detected and located,
the at least one electronic switching cell of any of the at least two main static conversion arms connected in series between the first input terminal and the second power supply input terminal are each capable of providing a stable permanent impedance less than a few tens of milli-ohms when any of the at least two main static conversion arms has experienced a failure resulting from the thermal runaway or the short circuit of one of the semi-conductor components of any of the at least two main static conversion arms,
the pair of isolation components of each of the at least two main static conversion arms are dimensioned in a manner so as to isolate any of the at least two main static conversion arms after the lapse of the first time period (t1) for the establishment of the stable low impedance failure mode on the at least one electronic switching cell of the at least two main static conversion arms connected in series and before the lapse of the second time period (t2) to avoid the creation of the circuit opening on any of the at least two main static conversion arms;
the associate control means of the at least one electronic switching cell of the single emergency back up conversion arm are capable of being deployed after the isolation of any of the at least two main static conversion arms that has become faulty so as to replace any of the at least two main static conversion arms that has become faulty partially or entirely,
the connection element of each switching circuit associated with the at least two main static conversion arms are configured to be in the locked state when any of the at least two main static conversion arms is active in the nominal mode and in a conductive state when any of the at least two main static conversion arms has become faulty and the single emergency back up conversion arm has become active.

8. The static converter according to claim 1, comprising:
a first number N greater than or equal to two, of the main static conversion arms, a second number K greater than or equal to two, of the emergency back up conversion arms, the same second number K of the switching circuits, each switching circuit being associated with a distinctly separate main static conversion arm, the first number N being greater than or equal to the second number K; and
each of the main static conversion arms are identical in structure and comprises at least one electronic switching cell equipped with associated control means, a first input terminal and a second power supply input terminal capable of being respectively connected to the first polarity and the second polarity of the power voltage source, a phase output terminal connected to an output switching cell capable of being connected to a separate and distinct phase of the electrical load, each of the at least one electronic switching cell being configured through the associate control means of the at least one electronic switching cell so as to be active in the predetermined nominal mode of the static converter;

the static converter comprises for each of the main static conversion arms, a pair of associated isolation components that are formed of a first isolation component and of a second isolation component each forming a dipole, the first isolation component and the second isolation component being directly and respectively connected to the first input terminal and the second power supply input terminal of corresponding main static conversion arm;

each of the emergency back up conversion arms consisting of at least one electronic switching cell with semiconductors equipped with associated control means, a first input terminal and a second power supply input terminal, suitable for being connected respectively to the first polarity and the second polarity of the power voltage source, an output terminal connected to an output switching cell; and each switching circuit of the main static conversion arms is an electronic semiconductor multi-pole comprising K connection elements, each of the K connection elements is a thyristor when the power voltage source is a direct current voltage source and a combination of two auxiliary thyristors connected in inverse parallel when the power voltage source is an alternating current source, each switching circuit comprises control means associated with the thyristors, each of the K connection elements of same switching circuit includes an input connected to the output of a different emergency back up conversion arm and an output connected to the first input of the main static conversion arm with which the switching circuit is associated;

the associate control means of the thyristors of the switching circuits are configured so as to be in the locked state when the main static conversion arms corresponding to the associate control means are active;

the associate control means of the thyristors of the switching circuits are configured in a manner such that when any of the main static conversion arms connected to a switcher is faulty, the faulty main static conversion arm is able to be backed up by any one of the emergency back up conversion arms that have not yet become active.

9. The static converter according to claim 1, wherein the static converter is an inverter capable of being connected to a direct current voltage source and of outputting to the electrical load an alternating current over at least one phase, the first input terminal and the second power supply input terminal of the main static conversion arm is capable of being respectively connected to the first positive polarity and the second negative polarity of the power voltage source;

each of the at least one electronic switching cell of the main static conversion arm or of the emergency back up conversion arm includes a pair of bidirectional power switches connected in series, each bidirectional power switch being formed by a controlled switch and an associated diode connected in antiparallel, each controlled switch being an element included in an assembly formed by thyristors, IGBT transistors, and MOS transistors;

the associate control means of the at least one electronic switching cell of the main static conversion arm are configured in a manner such that the static converter operates as the inverter on one or more phases;

the switching circuit comprises of a first uncontrolled unidirectional power semiconductor connection element and a second uncontrolled unidirectional power semiconductor connection element, the first uncontrolled unidirectional power semiconductor connection element being connected in direct from the output terminal of the emergency back up conversion arm to the first input terminal of the main static conversion arm, the second uncontrolled unidirectional power semiconductor connection element being connected in reverse from the output terminal of the emergency back up conversion arm to the second power supply input terminal of the main static conversion arm.

10. The static converter according to claim 1, wherein the static converter is a chopper capable of being connected to a direct current voltage source and of outputting to the electrical load a direct current over at least one output phase, the first input terminal and the second power supply input terminal of the main static conversion arm are capable of being respectively connected to the first positive polarity and the second negative polarity of the power voltage source, each of the at least one electronic switching cell of the main static conversion arm or of the emergency back up conversion arm includes a pair of bidirectional power switches connected in series with a diode or a second switch, each bidirectional power switch being formed by a controlled switch and an associated diode connected in antiparallel, each controlled switch being an element included in an assembly formed by thyristors, IGBT transistors, and MOS transistors;

the associate control means of the at least one electronic switching cell of the main static conversion arm are configured in a manner such that the static converter operates as a chopper, the switching circuit associated with the main static conversion arm comprises of a single semiconductor connection element configured to have unidirectional power flow, the single semiconductor connection element being connected in direct from the output of the emergency back up conversion arm to the first input terminal of the associated main static conversion arm.

11. The static converter according to claim 1, wherein the static converter is an AC/AC converter capable of converting electrical energy between an alternating current source and of outputting to the electrical load an alternating current over at least one output phase, the first input terminal and the second power supply input terminal of the main static conversion arm are capable of being respectively connected to the first positive polarity and the second negative polarity of the power voltage source, each of the at least one electronic switching cell of the main static conversion arm or of the emergency back up conversion arm includes a pair of bidirectional power switches connected in series, each bidirectional power switch being formed by a controlled switch and an associated diode connected in antiparallel, each controlled switch being an element included in an assembly formed by thyristors, IGBT transistors, and MOS transistors;

the associate control means of the at least one electronic switching cell of the main static conversion arm are configured in a manner such that the static converter operates as the AC/AC converter on one or more output phases, the switching circuit comprises a first bidirectional power semiconductor connection element and a second bidirectional power semiconductor connection element, the first bidirectional power semiconductor connection element being connected from the output of the emergency back up conversion arm to the first input terminal of the main static conversion arm, the second bidirectional power semiconductor connection element being connected in reverse from the output of the emergency back up conversion arm to the second negative input terminal of the main static conversion arm.

12. The static converter according to claim 1, wherein
the static converter is an inverter configured to be connected to a direct current voltage source and for outputting to the electrical load an alternating current over at least one phase (A, B, C), comprising a capacitive divider bridge, configured to provide a stable input power supply voltage centre tap, and comprising for each of the at least one phase an associated main static conversion arm a component for isolation of each of the main static conversion arm from the centre tap of the capacitive divider bridge, each of the main static conversion arm associated with a phase, and the emergency back up conversion arm, comprises a separate input terminal for imposition of voltage centre tap;

the first input terminal and the second input power supply terminal of any of the main static conversion arms are connected respectively to the first positive polarity and to the second negative polarity of the power voltage source through a different pair of isolation components, each input terminal for imposition of voltage centre tap is connected to the stable input power supply voltage centre tap via an isolation component of an associated main static conversion arm of the centre tap of the capacitive divider bridge, each of the main static conversion arm comprises an output switching cell, having a connection terminal at the pair of bidirectional power switches of the main static conversion arm forming an output terminal of one phase (A), the switching circuit comprises a first uncontrolled unidirectional current flow semiconductor connection element and a second uncontrolled unidirectional current flow semiconductor connection element, the first uncontrolled unidirectional current flow semiconductor connection element being connected in direct from the output of the emergency back up conversion arm to the first input terminal of the main static conversion arm, the second uncontrolled unidirectional current flow semiconductor connection element being connected in reverse from the output terminal of the emergency back up conversion arm to the second input power supply terminal of the main static conversion arm;

the associate control means of the at least one electronic switching cell of the main static conversion arm are configured in a manner such that the static converter operates as inverter over one or more phases when all the main static conversion arms function without fault.

13. The static converter according to claim 12, wherein
the static converter is a multi-level voltage Active Neutral Point Clamped or Neutral Point Clamped type inverter, each of the main static conversion arm comprises a first internal switching cell and a second internal switching cell, grouped in parallel, or in a single internal cell of which a series of switches is connected in parallel with a series of two diodes, and an external switching cell in which are nested the first and second internal switching cells, or the single internal cell and the series of two diodes, the first internal cell or the series of two diodes having a common point, the second internal cell or the single internal cell forming the output switching cell and having a terminal for connection to a pair of power switches of the output switching cell forming an output terminal of a phase (A), the means for controlling the at least one electronic switching cell of the main static conversion arm are configured such that the static converter operates as the multi-level voltage Active Neutral Point Clamped or Neutral Point Clamped type inverter over one or more phases when all the main static conversion arms function without fault.

14. The static converter according to claim 12 comprising for each of the main static conversion arm a different associated means of isolation of the centre tap of the main static conversion arm from the centre tap of the capacitive divider bridge.

15. A method for maintaining the static converter in service defined according to claim 1, comprising the steps of:
the associate control means of the at least one electronic switching cell of the main static conversion arm are configured so that the static converter operates in a nominal manner over the main static conversion arm when none power components forming the main static conversion arm is faulty, when a fault occurs on a switch of the at least one electronic switching cell of the main static conversion arm, all switches of the main static conversion arm to which the defective switch belongs and which are connected in series, are short circuited for a time period (t) for obtaining the isolation of the main static conversion arm that became faulty, which is greater than the first time period (t1) for the main static conversion arm to reach a stable and permanent conductive state at very low impedance less than the few tens of milli-ohms, and less than the second time period (t2) below which an integrity of components of a defective main static conversion arm is preserved as well as a conductive state attained by the defective main static conversion arm, switches of the emergency back up conversion arm configured in a same configuration as switches of the faulty main static conversion arm which are connected automatically by a switching circuit of the defective main static conversion arm that became a stable conductor.

* * * * *